United States Patent
Kato et al.

(10) Patent No.: US 10,779,918 B2
(45) Date of Patent: *Sep. 22, 2020

(54) INTERDENTAL CLEANING TOOL

(71) Applicants: Keisuke Kato, Takatsuki (JP); Makiko Yamane, Takatsuki (JP); Shinya Sakurai, Takatsuki (JP)

(72) Inventors: Keisuke Kato, Takatsuki (JP); Makiko Yamane, Takatsuki (JP); Shinya Sakurai, Takatsuki (JP)

(73) Assignee: SUNSTAR SUISSE S.A., Etoy (CH)

( * ) Notice: Subject to any disclaimer, the term of this patent is extended or adjusted under 35 U.S.C. 154(b) by 148 days.

This patent is subject to a terminal disclaimer.

(21) Appl. No.: 15/580,423

(22) PCT Filed: Jun. 8, 2016

(86) PCT No.: PCT/JP2016/067149
§ 371 (c)(1),
(2) Date: Dec. 7, 2017

(87) PCT Pub. No.: WO2016/199833
PCT Pub. Date: Dec. 15, 2016

(65) Prior Publication Data
US 2019/0133729 A1    May 9, 2019

(30) Foreign Application Priority Data

Jun. 8, 2015 (JP) ................................ 2015-116137
Jun. 8, 2015 (JP) ................................ 2015-116155
(Continued)

(51) Int. Cl.
*A61C 15/00* (2006.01)
*A61C 15/02* (2006.01)
(Continued)

(52) U.S. Cl.
CPC .............. *A61C 15/02* (2013.01); *A46B 3/005* (2013.01); *A46B 5/0029* (2013.01); *A46B 9/04* (2013.01);
(Continued)

(58) Field of Classification Search
CPC ........ A61C 15/00; A61C 15/02; A61C 15/046
(Continued)

(56) References Cited

U.S. PATENT DOCUMENTS

| 1,746,591 A * | 2/1930 | Heymann | A61C 15/02 |
| | | | 132/329 |
| 2010/0024839 A1* | 2/2010 | Kalbfeld | A46B 1/00 |
| | | | 132/329 |
| 2015/0257861 A1* | 9/2015 | Dishon | A46B 3/005 |
| | | | 132/329 |

FOREIGN PATENT DOCUMENTS

| JP | 3002668 B1 | 1/2000 |
| JP | 2001-506514 A | 5/2001 |
(Continued)

OTHER PUBLICATIONS

International Search Report for International Application No. PCT/JP2016/067149 dated Jul. 26, 2016.

*Primary Examiner* — Rachel R Steitz
(74) *Attorney, Agent, or Firm* — Kratz, Quintos & Hanson, LLP

(57) ABSTRACT

Provided is an interdental cleaning tool which has a simple configuration and can effectively prevent an occurrence of breakage of a core base portion when inserting the interdental cleaning tool into an interdental space or during interdental cleaning without reducing productivity of the interdental cleaning tool. An interdental cleaning tool (1) includes: a base portion (10) made of a synthetic resin; and a soft portion (20) made of an elastomer, the base portion (10) having a handle base portion (11) and a core base
(Continued)

portion (12), the soft portion (20) having at least a cleaning soft portion (21) that covers the core base portion (12), in which two or more cleaning portion recesses (14) which penetrate the cleaning soft portion (21) and form core base portion recesses in the core base portion (12) are formed on each of a first side portion and second side portion of a cleaning portion (2) at an interval in an axial direction of the cleaning portion (2), and at least one set of two cleaning portion recesses (14) out of plural sets of cleaning portion recesses (14) paired with each other between the first side portion and the second side portion are formed at an interval in the axial direction of the cleaning portion (2) so as not to overlap each other in a circumferential direction of the cleaning portion (2).

8 Claims, 22 Drawing Sheets

(30) Foreign Application Priority Data

Jun. 8, 2015 (JP) .................................. 2015-116156
Jun. 8, 2015 (JP) .................................. 2015-116165

(51) Int. Cl.
*A46B 3/00* (2006.01)
*A46B 9/04* (2006.01)
*B29C 45/14* (2006.01)
*B29C 45/26* (2006.01)
*B29C 45/16* (2006.01)
*A46B 5/00* (2006.01)
*A46B 15/00* (2006.01)

(52) U.S. Cl.
CPC .... *A46B 15/0093* (2013.01); *B29C 45/14065* (2013.01); *B29C 45/1676* (2013.01); *B29C 45/2626* (2013.01); *A46B 5/0037* (2013.01); *A46B 2200/108* (2013.01); *B29C 2045/14147* (2013.01)

(58) Field of Classification Search
USPC .................................................. 132/321, 329
See application file for complete search history.

(56) References Cited

FOREIGN PATENT DOCUMENTS

| | | |
|---|---|---|
| JP | 4236571 B2 | 3/2009 |
| JP | 2013-188299 A | 9/2013 |
| JP | 2013-192866 A | 9/2013 |
| WO | 2013176297 A1 | 11/2013 |
| WO | 2014005659 A1 | 1/2014 |
| WO | 2014023424 A1 | 2/2014 |

* cited by examiner

FIG. 2 (a)
FIG. 2 (b)
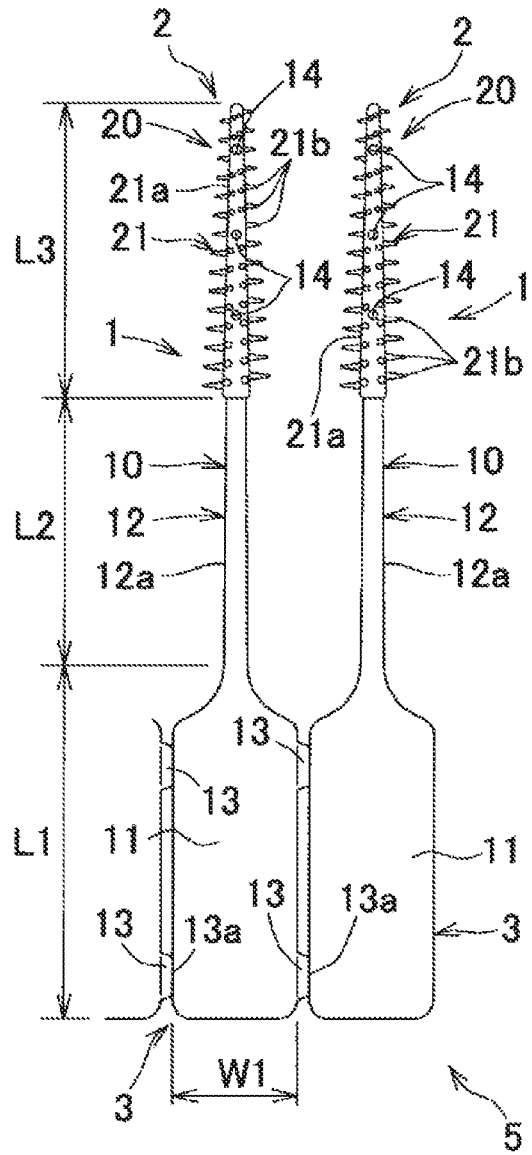
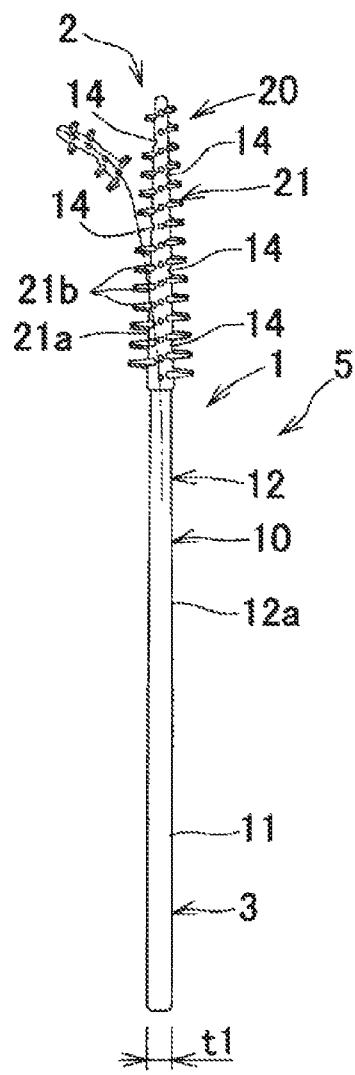

FIG. 26

| | Example 1 | Example 2 | Example 3 | Example 4 | Example 5 | Example 6 | Comparative Example 1 | Comparative Example 2 |
|---|---|---|---|---|---|---|---|---|
| Planar shape of recess | Circular | Circular | Japanese straw ricebag shaped | Japanese straw ricebag shaped | Rectangular | Rectangular | Circular | Circular |
| Diameter or width of recess mm | 0.4 | 0.4 | 0.4 | 0.4 | 0.4 | 0.4 | 0.4 | 0.4 |
| Length of recess mm | -- | -- | 1.14 | 1.14 | 1.2 | 1.2 | -- | -- |
| Depth of recess mm | 0.07 | 0.07 | 0.07 | 0.07 | 0.07 | 0.07 | 0.07 | 0.07 |
| Arrangement of upper and lower recesses ⊛ Recess on upper surface side ○ Recess on lower surface side | Separated by distance equivalent to or maximum axial lengths of recesses | Separated by distance equivalent to three diameters or maximum axial lengths of recesses | Same as in Example 1 | Same as in Example 2 | Same as in Example 1 | Same as in Example 2 | Same position on upper and lower sides | Portion where halves of diameters or maximum axial lengths of recesses overlap each other |
| Finite element analysis result | | | | | | | | |
| Stress value MPa | 3.96 | 3.74 | 2.92 | 2.40 | 3.04 | 2.40 | 5.12 | 5.04 |
| Stress scale | von Mises (N/m^2) 5,778,671.000 5,297,115.000 4,815,559.000 4,334,003.000 3,852,447.250 3,370,891.250 2,889,335.500 2,407,779.500 1,926,223.625 1,444,667.750 963,111.813 481,555.906 0.000 | von Mises (N/m^2) 5,778,671.000 5,297,115.000 4,815,559.000 4,334,003.000 3,852,447.250 3,370,891.250 2,889,335.500 2,407,779.500 1,926,223.625 1,444,667.750 963,111.813 481,555.906 0.000 | von Mises (N/m^2) 5,704,316.500 5,228,957.000 4,753,597.000 4,278,237.500 3,802,877.750 3,327,518.000 2,852,158.250 2,376,798.500 1,901,438.875 1,426,079.125 950,719.438 475,359.719 0.000 | von Mises (N/m^2) 5,704,316.500 5,228,957.000 4,753,597.000 4,278,237.500 3,802,877.750 3,327,518.000 2,852,158.250 2,376,798.500 1,901,438.875 1,426,079.125 950,719.438 475,359.719 0.000 | von Mises (N/m^2) 5,565,410.000 5,101,625.500 4,637,841.500 4,174,057.500 3,710,273.250 3,246,489.000 2,782,705.000 2,318,920.750 1,855,136.625 1,391,352.500 927,568.313 463,784.156 0.000 | von Mises (N/m^2) 5,565,410.000 5,101,625.500 4,637,841.500 4,174,057.500 3,710,273.250 3,246,489.000 2,782,705.000 2,318,920.750 1,855,136.625 1,391,352.500 927,568.313 463,784.156 0.000 | von Mises (N/m^2) 5,778,671.000 5,297,115.000 4,815,559.000 4,334,003.000 3,852,447.250 3,370,891.250 2,889,335.500 2,407,779.500 1,926,223.625 1,444,667.750 963,111.813 481,555.906 0.000 | von Mises (N/m^2) 5,778,671.000 5,297,115.000 4,815,559.000 4,334,003.000 3,852,447.250 3,370,891.250 2,889,335.500 2,407,779.500 1,926,223.625 1,444,667.750 963,111.813 481,555.906 0.000 |

FIG. 27

| | | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|
| Planar shape of recess | | Circular | Japanese straw ricebag shaped | Japanese straw ricebag shaped | Japanese straw ricebag shaped | Rectangular | Rectangular | Rectangular |
| Diameter or width of recess | mm | 0.4 | 0.4 | 0.4 | 0.4 | 0.4 | 0.4 | 0.4 |
| Length of recess | mm | - | 1.14 | 1.14 | 1.14 | 1.2 | 1.2 | 1.2 |
| Depth of recess | mm | 0.07 | 0.07 | 0.07 | 0.07 | 0.07 | 0.07 | 0.07 |
| Arrangement of upper and lower recesses ● Recess on upper surface side ○ Recess on lower surface side | | ⊗ Circumscribing when viewed from above | Same as in Comparative Example 1 | Same as in Comparative Example 2 | Same as in Comparative Example 3 | Same as in Comparative Example 1 | Same as in Comparative Example 2 | Same as in Comparative Example 3 |
| Finite element analysis result | | | | | | | | |
| Stress value | MPa | 4.69 | 5.00 | 5.13 | 4.44 | 5.24 | 5.54 | 4.65 |
| Stress scale | | von Mises (N/m^2) 5,778,671.000 5,297,115.000 4,815,559.000 4,334,003.000 3,852,447.250 3,370,891.250 2,889,335.500 2,407,779.500 1,926,223.625 1,444,667.750 963,111.813 481,555.906 0.000 | von Mises (N/m^2) 5,704,316.500 5,228,957.000 4,753,597.000 4,278,237.500 3,802,877.750 3,327,518.000 2,852,158.250 2,376,798.500 1,901,438.875 1,426,079.125 950,719.438 475,359.719 0.000 | von Mises (N/m^2) 5,704,316.500 5,228,957.000 4,753,597.000 4,278,237.500 3,802,877.750 3,327,518.000 2,852,158.250 2,376,798.500 1,901,438.875 1,426,079.125 950,719.438 475,359.719 0.000 | von Mises (N/m^2) 5,704,316.500 5,228,957.000 4,753,597.000 4,278,237.500 3,802,877.750 3,327,518.000 2,852,158.250 2,376,798.500 1,901,438.875 1,426,079.125 950,719.438 475,359.719 0.000 | von Mises (N/m^2) 5,565,410.000 5,101,625.500 4,637,841.500 4,174,057.500 3,710,273.250 3,246,489.000 2,782,705.000 2,318,920.750 1,855,136.625 1,391,352.500 927,568.313 463,784.156 0.000 | von Mises (N/m^2) 5,565,410.000 5,101,625.500 4,637,841.500 4,174,057.500 3,710,273.250 3,246,489.000 2,782,705.000 2,318,920.750 1,855,136.625 1,391,352.500 927,568.313 463,784.156 0.000 | von Mises (N/m^2) 5,565,410.000 5,101,625.500 4,637,841.500 4,174,057.500 3,710,273.250 3,246,489.000 2,782,705.000 2,318,920.750 1,855,136.625 1,391,352.500 927,568.313 463,784.156 0.000 |

FIG. 28

| | Example 7 | Example 8 | Example 9 |
|---|---|---|---|
| Planar shape of recess | Japanese straw ricebag shaped | Japanese straw ricebag shaped | Rectangular |
| Diameter or width of recess  mm | 0.4 | 0.4 | 0.4 |
| Length of recess  mm | 1.14 | 1.14 | 1.2 |
| Depth of recess  mm | 0.07 | 0.07 | 0.07 |
| Arrangement of upper and lower recesses<br>◉ Recess on upper surface side<br>○ Recess on lower surface side | Separated by distance equivalent to one diameter or maximum axial length of recesses | Separated by distance equivalent to one fourth diameter or maximum axial length of recesses | Same as in Example 7 |
| Finite element analysis result | | | |
| Stress value  MPa | 3.38 | 3.85 | 3.40 |
| Stress scale | von Mises (N/m^2)<br>5,704,316.500<br>5,228,957.000<br>4,753,597.000<br>4,278,237.500<br>3,802,877.750<br>3,327,518.000<br>2,852,158.250<br>2,376,798.500<br>1,901,438.875<br>1,426,079.125<br>950,719.438<br>475,359.719<br>0.000 | von Mises (N/m^2)<br>5,704,316.500<br>5,228,957.000<br>4,753,597.000<br>4,278,237.500<br>3,802,877.750<br>3,327,518.000<br>2,852,158.250<br>2,376,798.500<br>1,901,438.875<br>1,426,079.125<br>950,719.438<br>475,359.719<br>0.000 | von Mises (N/m^2)<br>5,565,410.000<br>5,101,625.500<br>4,637,841.500<br>4,174,057.500<br>3,710,273.250<br>3,246,489.000<br>2,782,705.000<br>2,318,920.750<br>1,855,136.625<br>1,391,352.500<br>927,568.313<br>463,784.156<br>0.000 |

FIG. 29

| | Example 10 | Example 11 | Example 12 | Example 13 | Example 14 |
|---|---|---|---|---|---|
| Planar shape of recess | Circular | Circular | Japanese straw ricebag shaped | Japanese straw ricebag shaped | Japanese straw ricebag shaped |
| Diameter or width of recess  mm | 0.4 | 0.4 | 0.4 | 0.4 | 0.4 |
| Length of recess  mm | - | - | 1.14 | 1.14 | 1.14 |
| Depth of recess  mm | 0.02 | 0.05 | 0.02 | 0.02 | 0.05 |
| Arrangement of upper and lower recesses<br>⊛ Recess on upper surface side<br>○ Recess on lower surface side | ⊛ ○ (separated)<br>Separated by distance equivalent to one diameter or maximum axial length of recesses | Same as in Example 10 | ⊛ ○<br>Separated by distance equivalent to one forth diameter or maximum axial length of recesses | Same as in Example 10 | Same as in Example 12 |
| Finite element analysis result | | | | | |
| Stress value  MPa | 3.63 | 3.96 | 3.20 | 2.78 | 3.71 |
| Stress scale | von Mises (N/m^2)<br>5,778,671.000<br>5,297,115.000<br>4,815,559.000<br>4,334,003.000<br>3,852,447.250<br>3,370,891.250<br>2,889,335.500<br>2,407,779.500<br>1,926,223.625<br>1,444,667.750<br>963,111.813<br>481,555.906<br>0.000 | von Mises (N/m^2)<br>5,778,671.000<br>5,297,115.000<br>4,815,559.000<br>4,334,003.000<br>3,852,447.250<br>3,370,891.250<br>2,889,335.500<br>2,407,779.500<br>1,926,223.625<br>1,444,667.750<br>963,111.813<br>481,555.906<br>0.000 | von Mises (N/m^2)<br>5,704,316.500<br>5,228,957.000<br>4,753,597.000<br>4,278,237.500<br>3,802,877.750<br>3,327,518.000<br>2,852,158.250<br>2,376,798.500<br>1,901,438.875<br>1,426,079.125<br>950,719.438<br>475,359.719<br>0.000 | von Mises (N/m^2)<br>5,704,316.500<br>5,228,957.000<br>4,753,597.000<br>4,278,237.500<br>3,802,877.750<br>3,327,518.000<br>2,852,158.250<br>2,376,798.500<br>1,901,438.875<br>1,426,079.125<br>950,719.438<br>475,359.719<br>0.000 | von Mises (N/m^2)<br>5,704,316.500<br>5,228,957.000<br>4,753,597.000<br>4,278,237.500<br>3,802,877.750<br>3,327,518.000<br>2,852,158.250<br>2,376,798.500<br>1,901,438.875<br>1,426,079.125<br>950,719.438<br>475,359.719<br>0.000 |

FIG. 30

| | | Example 15 | Example 16 | Example 17 | Example 18 | Example 19 |
|---|---|---|---|---|---|---|
| Planar shape of recess | | Japanese straw ricebag shaped | Rectangular | Rectangular | Rectangular | Rectangular |
| Diameter or width of recess | mm | 0.4 | 0.4 | 0.4 | 0.4 | 0.4 |
| Length of recess | mm | 1.14 | 1.14 | 1.14 | 1.14 | 1.14 |
| Depth of recess | mm | 0.05 | 0.02 | 0.02 | 0.05 | 0.05 |
| Arrangement of upper and lower recesses ● Recess on upper surface side ○ Recess on lower surface side | | ●●○ Separated by distance equivalent to one diameter or maximum axial length of recesses | ●○● Separated by distance equivalent to one forth diameter or maximum axial length of recesses | Same as in Example 15 | Same as in Example 16 | Same as in Example 15 |
| Finite element analysis result | | | | | | |
| Stress value | MPa | 3.30 | 3.70 | 3.24 | 3.34 | 2.70 |
| Stress scale | | von Mises (N/m^2) 5,704,316.500 5,228,957.000 4,753,597.000 4,278,237.500 3,802,877.750 3,327,518.000 2,852,158.250 2,376,798.500 1,901,438.875 1,426,079.125 950,719.438 475,359.719 0.000 | von Mises (N/m^2) 5,565,410.000 5,101,625.500 4,637,841.500 4,174,057.500 3,710,273.250 3,246,489.000 2,782,705.000 2,318,920.750 1,855,136.625 1,391,352.500 927,568.313 463,784.156 0.000 | von Mises (N/m^2) 5,565,410.000 5,101,625.500 4,637,841.500 4,174,057.500 3,710,273.250 3,246,489.000 2,782,705.000 2,318,920.750 1,855,136.625 1,391,352.500 927,568.313 463,784.156 0.000 | von Mises (N/m^2) 5,565,410.000 5,101,625.500 4,637,841.500 4,174,057.500 3,710,273.250 3,246,489.000 2,782,705.000 2,318,920.750 1,855,136.625 1,391,352.500 927,568.313 463,784.156 0.000 | von Mises (N/m^2) 5,565,410.000 5,101,625.500 4,637,841.500 4,174,057.500 3,710,273.250 3,246,489.000 2,782,705.000 2,318,920.750 1,855,136.625 1,391,352.500 927,568.313 463,784.156 0.000 |

INTERDENTAL CLEANING TOOL

TECHNICAL FIELD

The present invention relates to an interdental cleaning tool having a cleaning portion covered with an elastomer.

BACKGROUND ART

There has been commercialized an interdental cleaning tool including a base portion made of a synthetic resin and a soft portion made of an elastomer, in which the base portion includes a handle base portion and a core base portion provided at a tip end of the handle base portion and having an elongated shaft shape, the soft portion includes at least a cleaning soft portion covering the core base portion, the handle base portion forms a handle portion as a grip, and the core base portion and the cleaning soft portion form a cleaning portion for cleaning a space between teeth (see, e.g., Patent Literatures 1 to 5).

A method widely used to manufacture the interdental cleaning tool includes: filling a synthetic resin material into a first molding space of a first die to form a base portion; placing, in a second molding space of a second die, the base portion molded in the first die; and filling an elastomeric material into the second molding space to form a soft portion in a state of positioning and holding a core base portion at a central part of the second molding space by plural sets of holding pins provided in a first mold and second mold of the second die in a manner of being opposite to each other at an interval in a length direction (axial direction of the core base portion) of the second molding space, so that the interdental cleaning tool is obtained. In general, a plurality of interdental cleaning tools are also molded simultaneously by a method that includes: providing a first die having a plurality of first molding spaces and a second die having the same number of second molding spaces as the first molding spaces; in manufacturing the interdental cleaning tools, supplying a synthetic resin material to the first molding spaces to simultaneously form a plurality of base portions so that the plurality of base portions can be connected to one another by a runner portion; placing, in the second molding spaces of the second die, a primary molded product made of the plurality of base portions connected to one another by the runner portion; and then filling an elastomeric material into the plurality of second molding spaces, so that a plurality of interdental cleaning tools are simultaneously formed.

CITATIONS LIST

Patent Literature

Patent Literature 1: Japanese Patent No. 4236571
Patent Literature 2: Japanese Patent No. 3002668
Patent Literature 3: Japanese Translation of PCT International Application Publication No. 2001-506514
Patent Literature 4: Japanese Unexamined Patent Application Publication No. 2013-192866
Patent Literature 5: Japanese Unexamined Patent Application Publication No. 2013-188299

SUMMARY OF INVENTION

Technical Problems

When the cleaning portion is inserted into the interdental space, a large compressive force acts on the axial direction. In addition, when spaces between molars, particularly between large molars are cleaned, it is necessary to insert, into these spaces, a portion from a tip end portion to an intermediate portion of the interdental cleaning tool that is inserted between the molars into an oral cavity in the anterior-posterior direction, while curving the portion from the tip end portion to the intermediate portion by 60° to 90°. Moreover, during interdental cleaning, it is necessary to put the cleaning portion in and out from a gap between the molars in the curved state, so that a large bending load acts on the cleaning portion. For this reason, in the interdental cleaning tool in which the base portion is made of a synthetic resin material, countermeasures against breakage of the cleaning portion at the time of insertion between teeth or during interdental cleaning are one of the important problems.

As one of the countermeasures against the breakage of the cleaning portion, there is also proposed one in which glass fiber is added to the synthetic resin material forming the base portion. When the glass fiber is added by an amount enough to prevent the elongated cleaning portion from being broken is added, then strength and rigidity of the core base portion in the axial direction of the core is increased. This improves the insertability into an interdental portion. However, there has been a problem that a stronger force is required to insert the interdental cleaning tool since the core base portion has difficulty in warping. This causes a large bending load to easily act on the core base portion during cleaning spaces between the molars, and thus the core base portion breaks at an intermediate portion in the length direction.

On the other hand, when super engineering plastics such as polyether sulfone is adopted as the core base portion, the core base portion becomes easy to warp and the breakage of the cleaning portion can be suppressed. However, for molding of the super engineering plastics, a high injection temperature is essential, and a cooling time after injection molding becomes long. This causes the productivity of the interdental cleaning tool to be lowered, and material cost is also high. This considerably increases total manufacturing cost. There has been such a problem.

The inventors of the present invention have found out the following as causes of the breakage of the core base portion. First, a recess is likely to be formed at a position where the holding pin for positioning the core base portion in the second die during molding of the cleaning soft portion and the core base portion are in contact with each other. Second, a cross-sectional area of the core base portion becomes smaller at the position of this recess, and a stress generated by application of bending force to the core base portion becomes higher. Third, a structural change is likely to occur due to the existence of the recess in a region to which such a high stress concentrates, and the core base portion is broken in the vicinity of a shaft position where the recess is formed due to the bending force acting upon insertion of the interdental cleaning tool into the interdental space or during interdental cleaning.

Although a mechanism in which the recess is formed in the core base portion by the holding pin is not clear, it can be presumed that the recess is formed by the following mechanism. That is, the base portion molded by the first die is placed in the second die after being cooled, and in order to shorten a molding time, the base portion is placed in the second die in a relatively high temperature state. In addition, the base portion placed in the second die is softened during molding of the cleaning soft portion since the base portion is exposed to the high-temperature elastomer filled in the second molding space. In the second die, the plural sets of holding pins are allowed to protrude into the second molding space by a preset protruding length, and the core base portion is positioned at the central part of the second molding space. Here, the molding time is shortened, causing variations in molding dimensions of the core base portion. The core base portion is exposed to the high temperature, causing thermal expansion thereof. The core base portion may vibrate at the time of filling the elastomer. With these, it can be presumed that the tip end portion of the holding pin bites into the core base portion and the recess is formed in the core base portion.

In addition, in a so-called I-type interdental cleaning tool in which a center line of the handle portion and an axis of the core base portion are disposed coaxially with each other, when the handle portion is formed into a flat shape in order to facilitate gripping with fingers, the handle portion is usually formed to be flat with respect to a mold opening and closing direction of the first die and the second die, and the holding pins are provided so that an axial direction of the holding pins can be disposed in the mold opening and closing direction of the second die in order to simplify a structure of the dies as much as possible. In view of the above, the inventors of the present invention have found that, in the I-type interdental cleaning tool, when the space between the molars is cleaned by gripping the handle portion, the recess of the core base portion, which is formed by each of the holding pins is disposed in each of an outer peripheral side of the curved core base portion and an inner peripheral side thereof and concentration of a large stress occurs in the vicinity of each of recesses on the inner and outer peripheral sides, so that the core base portion is easily broken.

An object of the present invention is to provide an interdental cleaning tool which has a simple configuration and can effectively prevent the occurrence of the breakage of the core base portion at the time of inserting the interdental cleaning tool into interdental spaces or during interdental cleaning without reducing the productivity of the interdental cleaning tool.

Solutions to Problems

The present invention includes the following inventions.
(Interdental Cleaning Tool)

(1) An interdental cleaning tool, which includes: a base portion made of a synthetic resin; and a soft portion made of an elastomer that covers at least a part of the base portion, the base portion including a handle base portion and a core base portion that has an elongated shaft-shape and connects continuously to a tip end portion of the handle base portion, the soft portion having at least a cleaning soft portion that covers the core base portion, the handle base portion constituting a handle portion serving as a grip, and the core base portion and the cleaning soft portion which constitute a cleaning portion for interdental cleaning, in which two or more cleaning portion recesses which penetrate the cleaning soft portion and form core base portion recesses in the core base portion are formed on each of a first side portion and a second side portion of the cleaning portion at an interval in an axial direction of the cleaning portion, and at least one set of the two cleaning portion recesses out of plural sets of the cleaning portion recesses pairing with each other between the first side portion and the second side portion are formed at an interval in the axial direction of the cleaning portion so as to be avoided from overlapping each other in a circumferential direction of the cleaning portion.

Note that the first side portion and second side portion of the cleaning portion mean one half of an outer peripheral surface of the cleaning portion, which is molded by one of dies, and a remaining half of the outer peripheral surface of the cleaning portion, which is molded by other die, in a second die for molding the cleaning portion. Further, the cleaning portion recesses other than the cleaning portion recesses formed at an interval in the axial direction of the cleaning portion can be formed so as to face each other with the core base portion interposed therebetween. In addition, in the present specification, the cleaning portion recesses of the second side portion, which are paired with the cleaning portion recesses of the first side portion, mean cleaning portion recesses located at the same order positions counted from the tip end of the cleaning portion. Note that the interval in the axial direction of the cleaning portion refers to a shortest distance when ends of two recesses are connected to each other in the axial direction of the cleaning portion. Specifically, the interval is obtained by the following procedure. First, a plane (BS in FIG. 19) including UL and a center line (CL in FIG. 19) of the core base portion is set. Next, perpendicular lines are drawn to CL from the intersections (B, T in FIG. 19) of the respective recesses of the first side portion and the second side portion and the BS, and intersections of the perpendicular lines and CL are obtained. Further, intersections of CL and the perpendicular lines obtained from the first side portion are obtained. One is selected from the obtained two points on the CL in the first side portion, one is selected from two points on the CL in the second side portion, and a length between both of the points on the CL is obtained. Since there are four combinations, the number of lengths obtained above is four. A shortest length among the obtained four lengths is defined as the "interval in the axial direction of the cleaning portion" between the two recesses which do not overlap each other in the circumferential direction. In the present application, there are two types of recesses, which are a cleaning portion recess and a core base portion recess. The recesses are obtained by replacing the above-described "recess" with the recesses desired to be obtained.

In manufacturing the interdental cleaning tool, a synthetic resin material is filling into a first molding space of a first die to mold a base portion, the base portion molded in the first die is placed in a second molding space of a second die, and an elastomeric material is filled into the second molding space to form a soft portion in a state of holding a core base portion at a central part of the second molding space with plural sets of holding pins provided in a first mold and second mold of the second die at an interval in a length direction of the second molding space. On the first side portion and second side portion of the cleaning portion in the interdental cleaning tool manufactured in this manner, the cleaning portion recesses are formed at positions where the tip end portions of the holding pins contact the core base portion, and further, on the core base portion, the plural sets of core base portion recesses, which are formed by receiving abutment of the tip end portions of the holding pins, are generated at intervals in the axial direction of the core base portion.

In this interdental cleaning tool, at least one set of two cleaning portion recesses out of plural sets of the cleaning portion recesses, each pair of which is formed between the first side portion and the second side portion, are formed at an interval in the axial direction of the cleaning portion so as not to overlap each other in the circumferential direction of the cleaning portion. Accordingly, the core base portion recesses are formed alternately on the first side portion and second side portion of the core base portion during molding of the soft portion, and a pair of the core base portion recesses can be prevented from being formed at the same position in the axial direction of the core base portion. Therefore, a cross-sectional area of the core base portion at a position corresponding to each of the core base portion recesses becomes larger than that of the holding pins which overlap each other in the circumferential direction, and the occurrence of the breakage of the core base portion can be prevented. In addition, since the positions in the axial direction of the core base portion, where the respective holding pins apply force to the core base portion, do not overlap each other, a portion in the axial direction of the core base portion, where the core base portion is subjected to the force, becomes longer in comparison with the case of disposing the holding pins which overlap each other in the circumferential direction. As a result, the core base portion is more firmly held, and the core base portion recesses 14Ea formed during the molding of the soft portion 20 is suppressed from being deepened. Hence, the cross-sectional area of the core base portion 12 at each of the positions corresponding to the core base portion recesses 14Ea is increased, and the occurrence of breakage of the core base portion 12 can be prevented. Furthermore, since the interval between the holding pins in the length direction of the core base portion is substantially shortened, it is possible to hold the core base portion satisfactorily stably. For this reason, the core base portion can be effectively prevented from being broken at the time of insertion into the space between the teeth or during interdental cleaning while constituting the base portion with a synthetic resin material having excellent productivity. With regard to the "depth of the core base portion recess", a straight line (UL in FIG. 19) is first set, which connects points (points B and T in FIG. 19) of a plane (BS in FIG. 19) passing through a longitudinal center line (CL in FIG. 19) of the core base portion and ends of each of the core base portion recesses to each other. Next, a perpendicular line (DL in FIG. 19) drawn to CL from an arbitrary point of UL is set. The "depth of the core base portion recess" means a length of a straight line (DLa in FIG. 19) that connects an intersection (C1 in FIG. 19) of this DL with the UL, and an intersection (C2 in FIG. 19) of this DL with a bottom surface (CS in FIG. 19) of the core base portion recess to each other. "Not overlapping in the circumferential direction" means that two cleaning portion recesses of the two holding pins forming a set are in a positional relationship of not overlapping each other even when the cleaning portion recesses are moved in the circumferential direction of the cleaning portion. Further, the "depth of the core base portion recess" means a degree of deformation (distance at which the core base portion is compressed and deformed) of the core base portion, the deformation being caused by the fact that the holding pins abut against the core base portion during molding in the second die. The "cross-sectional area of the core base portion" means an area of the core base portion in a plane (VS in FIG. 19) perpendicular to the axial central axis (CL in FIG. 19) of the core base portion. The "position corresponding to the core base portion recess" means a range (position) of the straight line CL in which the core base portion recess is included in the plane VS.

(2) In the interdental cleaning tool according to (1), the aforementioned at least one set of the cleaning portion recesses formed at the interval in the axial direction of the cleaning portion has therebetween an interval in the axial direction of the cleaning portion, the interval being set to one fourth or more of a maximum axial length of the cleaning portion recesses.

(3) In the interdental cleaning tool according to (1) or (2), the cleaning portion recesses are arranged so as to be substantially uniformly, or narrowed as approaching to a tip end side of the cleaning portion, in the axial direction of the cleaning portion, on each of the first side portion and the second side portion. That is, the tip end portion of the cleaning portion is a substantially linear and elongated shaft-shaped structure configured to have a smaller diameter than that of a base end portion, and is liable to structurally change with respect to the force applied by the molding when the cleaning soft portion is molded. Therefore, if the arrangement interval of the cleaning portion recesses is set so as to become narrower as approaching to the tip end side of the cleaning portion, or is set to be substantially uniform, as in the present invention, it is easy to suppress the core base portion from moving from a predetermined position during molding of the soft portion. In particular, it is the most preferable embodiment that the arrangement interval of the cleaning portion recesses in the axial direction of the cleaning portion is set substantially uniform. Such a configuration is more preferable since external force applied to the core base portion during the molding of the soft portion is likely to be uniform.

(4) In the interdental cleaning tool according to any one of (1) to (3), the plurality of core base portion recesses have opening areas that are set to be substantially identical in size to one another, or are set so that an opening area of the core base portion recess on a most tip end side among the plurality of core base portion recesses is smallest, on each of the first side portion and the second side portion. The "opening area of the core base portion recess" means an area where the holding pin and the core base portion are in contact during the molding using the second dies. In the interdental cleaning tool of the present invention, the opening area of the core base portion recess can be confirmed as an area of a portion (CS in FIG. 19) of the core base portion, which is not covered with the soft portion made of the elastomer. Since the core base portion is an elongated conical structure, and the cross-sectional area thereof becomes smaller as approaching to the tip end side, it is preferable to set the opening area at the tip end portion, where the cross sectional area is the smallest, to be the smallest. In other words, since the opening area of the core base portion recess changes in accordance with the tip end portion area of the holding pin holding the core base portion with respect to the central part of the second molding space, the tip end portion area of the holding pin located at the most tip end side of the core base portion is substantially identical in size to one another or smallest as compared with the tip end portion areas of the holding pins at the other positions. On the other hand, in the second molding space, with regard to a molding portion for molding the cleaning soft portion, a passage area thereof on the tip end side of the second molding space is narrowed. Therefore, as in the present invention, the opening area of the core base portion recess on the most tip end side of the core base portion is set to be as small as possible, that is, the tip end portion area of the holding pin on the tip end side is reduced, whereby a passage area of the second molding space is made as large as possible. Then, a flow resistance of the elastomeric material can be set as small as possible. In addition, the influence of the Karman vortex, which is generated in the vicinity of each holding pin, on the molded product and the holding pin can be further suppressed, holding of the core base portion can be improved, and poor filling of the elastomeric material with respect to the cleaning soft portion molding portion can be prevented.

(5) In the interdental cleaning tool according to any one of (1) to (4), the aforementioned at least one of the plurality of cleaning portion recesses has the core base portion recess that has an opening shape elongated in the axial direction of the cleaning portion in each case of the cleaning portion recesses formed at an interval in the axial direction of the cleaning portion so as not to overlap each other in the circumferential direction of the cleaning portion and of the cleaning portion recesses formed so as to overlap each other in the circumferential direction of the cleaning portion. Formation of the core base portion recesses with this shape can be realized by matching a shape of such a pin tip of the holding pin at the corresponding position with the shape of the core base portion recesses to be formed. In order to increase a degree of freedom in arrangement layout of cleaning protrusions, it is necessary to minimize the area of the core base portion recesses. For example, when the pin tip shape of the holding pin is circular, a diameter of the pin tip of the holding pin is reduced, reducing the area of each of the core base portion recesses. However, the diameter of the pin tip of the holding pin is reduced, reducing the contact area of the holding pin with respect to the core base portion. Accordingly, the depth of the core base portion recess tends to be deepened, and stress concentration tends to occur at a position where each of the core base portion recesses is provided. In addition, fixed regions of the core base portion are reduced, requiring a pressing force of the holding pins to rise in order to firmly fix the core base portion. This further enhances the stress concentration to occur at the positions where the core base portion recesses are provided. Each of the core base portion recesses is formed into the shape elongated in the axial direction of the cleaning portion, whereby the degree of freedom in arrangement layout of the cleaning protrusions is improved. In addition, since the holding pins of the first side portion and the second side portion with respect to the core base portion apply forces to different positions of the core base portion, vibrations of the core base portion during molding of the soft portion can be suppressed as compared with the case of holding pins having a circular shape with the same area. Therefore, the depth of the core base portion recess formed during molding of the soft portion can be made shallow, and the stress concentration at the position of the cleaning portion, where the core base portion recess exists during use can be effectively prevented. Accordingly, this configuration is preferable. In particular, it is more preferable that the cleaning portion recesses be formed at intervals in the axial direction of the cleaning portion so as not to overlap each other in the circumferential direction of the cleaning portion. The "shape elongated in the axial direction of the cleaning portion" means a shape having a maximum length in a direction of the center line (CL in FIG. 19) of the core base portion or in a spiral direction with respect to the center line of the core base portion, which is longer than a maximum length in a direction of the plane (VS in FIG. 19) perpendicular to the center line of the core base portion. Specifically, the "shape elongated in the axial direction of the cleaning portion" includes such a shape elongated in the spiral direction of the cleaning portion shaft as an elliptical shape, an oblong shape, a rectangular shape, an egg shape, an oval shape and a bale shape (rectangular shape with curved short side portions, rectangular shape with rounded corners), a teardrop shape, and a parallelogram shape.

(6) In the interdental cleaning tool according to (5), wherein the core base portion recess elongated in the axial direction has a maximum axial length of 0.4 mm or more and 1.5 mm or less, or 0.6 mm or more and 1.0 mm or less.

(7) In the interdental cleaning tool according to (5) or (6), wherein the core base portion recess elongated in the axial direction has an opening area of 0.15 mm$^2$ or more and 0.6 mm$^2$ or less, or 0.2 mm$^2$ or more and 0.4 mm$^2$ or less. Note that, in the interdental cleaning tool according to any one of (5) to (7), the cleaning portion recesses having the core base portion recesses having the shape elongated in the axial direction can also be formed individually on the first side portion and second side portion of the cleaning portion, which correspond to a predetermined spot within a range of 5.5 mm to 7.0 mm from the tip end of the core base portion.

(8) In the interdental cleaning tool according to any one of (1) to (7), the core base portion recesses has a maximum depth of set to 0.01 mm or more and 0.085 mm or less, in each case of the cleaning portion recesses formed at an interval in the axial direction of the cleaning portion so as not to overlap each other in the circumferential direction of the cleaning portion and of the cleaning portion recesses formed so as to overlap each other in the circumferential direction of the cleaning portion. In this interdental cleaning tool, the reduction of the cross-sectional area of the core base portion at the forming position of the core base portion recess (that is, a cross-sectional area perpendicular to the axial direction of the core base portion) is suppressed, and the occurrence of the stress concentration in the core base portion recess is suppressed. In addition, even if a recessed structure exists at a position where the stress concentrates, it becomes difficult to influence a change in the structure of the core base portion, so that the breakage of the core base portion at the time of the insertion into the space between the teeth or during the interdental cleaning can be prevented effectively. For this reason, the core base portion can be effectively prevented from being broken at the time of insertion into the space between the teeth or during interdental cleaning while constituting the base portion with a synthetic resin material having excellent productivity. Note that the maximum depth of the core base portion recess means a largest distance (maximum value of the depth of the core base portion recess) among shortest distances from the outer surface to the bottom surface of the opening portion of the core base portion recess. Specifically, the straight line (UL in FIG. 19) is first set, which connects the contact points (points B and T in FIG. 19) of the plane (BS in FIG. 19) passing through the longitudinal center line (CL in FIG. 19) of the core base portion and the ends of each of the core base portion recesses to each other, as shown in FIG. 19. Next, a perpendicular line (DL in FIG. 19) drawn to CL from an arbitrary point of UL is set. There is measured the length of the straight line (DLa in FIG. 19) that connects the intersection (C1 in FIG. 19) of this DL and the UL and the intersection (C2 in FIG. 19) of this DL and the bottom surface (CS in FIG. 19) of the core base portion recess to each other. The measurement of the length of DLa is performed between the point B and the point T (on the straight line UL) while rotating the BS around the CL, and a maximum value of the obtained numerical value DLa is defined as the "maximum depth of the core base portion recess".

(9) In the interdental cleaning tool according to any one of (1) to (8), two cleaning portion recesses in each set in the plural sets of cleaning portion recesses are formed at an interval in the axial direction of the cleaning portion so as not to overlap each other in the circumferential direction of the cleaning portion. Even if only a part of the plural sets of cleaning portion recesses is formed at an interval in the axial direction of the cleaning portion, such a trouble that the cleaning portion is broken during the interdental cleaning can be prevented effectively. If all sets of the cleaning portion recesses are individually formed at intervals in the axial direction of the cleaning portion so as not to overlap each other in the circumferential direction of the cleaning portion, the breakage of the cleaning portion can be prevented far more effectively. When only a part of the sets of the cleaning portion recesses is formed at intervals in the axial direction of the cleaning portion, it is preferable to form only the cleaning portion recesses at a spot where the stress concentration is liable to occur during the interdental cleaning at intervals in the axial direction of the cleaning portion. In this case, the remaining sets of cleaning portion recesses are provided opposite to each other with the core base portion interposed therebetween, or are disposed so as to be shifted in the axial direction of the core base portion within a range equal to or less than the diameter of the holding pins.

(10) In the interdental cleaning tool according to any one of (1) to (9), three or more cleaning portion recesses are formed on at least either one of the first side portion and the second side portion, in each case of the cleaning portion recesses formed at an interval in the axial direction of the cleaning portion so as not to overlap each other in the circumferential direction of the cleaning portion and of the cleaning portion recesses formed so as to overlap each other in the circumferential direction of the cleaning portion. When three or more cleaning portion recesses are provided on at least one side portion, unevenly distributed portions of stress generated by the bending force acting on the cleaning portion at the time of insertion into the interdental space or during the interdental cleaning can be dispersed to the forming positions of the three or more cleaning portion recesses, and the core base portion can be effectively prevented from being broken due to the application of the locally large bending force. Moreover, when the number of the cleaning portion recesses is increased, the number of holding pins provided in the second die for molding the soft portion increases. Accordingly, the contact area of the holding pins with respect to the core base portion increases, the vibrations of the core base portion during molding of the soft portion can be suppressed, and it becomes easy to perform control to make the depth of the core base portion recess shallow. Therefore, the occurrence of the stress concentration at the positions of the core base portion recesses during the interdental cleaning can be prevented effectively. Accordingly, this configuration is preferable. It should be noted that the number of the cleaning portion recesses of the first side portion and the second side portion may be the same or different. For example, the number of the cleaning portion recesses can be reduced by only one on the first side portion than on the second side portion.

(11) In the interdental cleaning tool according to any one of (1) to (10), the handle base portion and the core base portion are disposed on substantially the identical axis. When the handle base portion and the core base portion are disposed on substantially the identical axis as in the present invention, a plurality of the interdental cleaning tools can be molded to be closely arranged side by side in parallel, and the number of the interdental cleaning tools to be taken can be increased. Accordingly, this is preferable.

(12) In the interdental cleaning tool according to any one of (1) to (11), the base portion is made of a thermoplastic synthetic resin material having crystallinity in which a melting point is 150° C. or more. When the base portion is molded using the thermoplastic synthetic resin material having such a melting point, the production efficiency is increased by shortening a molding time of the base portion, particularly a cooling time thereof, whereby the productivity of the interdental cleaning tool can be improved, and eventually, manufacturing cost of the interdental cleaning tool can be reduced.

(13) In the interdental cleaning tool according to any one of (1) to (12), a maximum cross-sectional area of the core base portion at the position corresponding to the core base portion recess is 55.0 to 99.6%, preferably 70.0 to 99.0%, most preferably 80.0 to 97.9% with respect to the cross-sectional area of the core base portion at a position adjacent to the core base portion recess, in each case of the cleaning portion recesses formed at an interval in the axial direction of the cleaning portion so as not to overlap each other in the circumferential direction of the cleaning portion and of the cleaning portion recesses formed so as to overlap each other in the circumferential direction of the cleaning portion. With this configuration, the stress concentration in each of the core base portion recesses is reduced, and the breakage of the core base portion at the time of the insertion into the interdental space or during the interdental cleaning can be prevented far more effectively. Note that the "cross-sectional area of the core base portion" means an area of a portion where the plane (VS in FIG. 19) perpendicular to the center line (CL in FIG. 19) of the core base portion is in contact with the core base portion. Further, the "position adjacent to the core base portion recess" means an intersection position of the axial center line (CL) of the core base portion in FIG. 19 and the plane VS perpendicular to the CL when the plane VS has only one contact point with the end of the core base portion recess. There are two of such "positions adjacent to the core base portion recess" in one core base portion recess. For each cross-sectional area at these two points, a maximum cross-sectional area of the core base portion at a position corresponding to the core base portion recess is calculated. It is necessary for both of the two calculated values to be present within the above range. Further, the "position corresponding to the core base portion recess" means an intersection position of the axial center line (CL) of the core base portion and the plane VS perpendicular to the CL when the plane VS has a contact point with the end of the core base portion recess. That is, a straight line on the CL that connects the above two "positions adjacent to the core base portion recess" corresponds to the two points.

(14) In the interdental cleaning tool according to any one of (1) to (13), at least one set of the cleaning portion recesses out of plural sets of the cleaning portion recesses paired with each other between the first side portion and the second side portion has a central segment in a depth direction, which passes through centers of the at least one set of the cleaning portion recesses, and is formed with an angle in the circumferential direction of the cleaning portion with respect to a mold opening and closing direction of the dies for molding the cleaning soft portion, among the cleaning portion recesses formed at intervals in the axial direction of the cleaning portion so as not to overlap each other in the circumferential direction of the cleaning portion, and the cleaning portion recesses including other recesses if the other recesses are present. With this configuration, when a plurality of cleaning protrusions which protrude outward is formed in the cleaning soft portion, the degree of freedom in arrangement layout of the cleaning protrusions can be improved. In other words, the cleaning portion recesses are molded by holding pins which hold the core base portion in the central part of the second molding space. Since the positions of the holding pins can be adjusted in the length direction and the circumferential direction with respect to the second molding space so that the holding pins do not interfere with the forming positions of the cleaning protrusions, the degree of freedom in the arrangement layout of the cleaning protrusions can be improved.

(15) In the interdental cleaning tool according to any one of (1) to (14), at least either one of a fibrous material and talc is added to the synthetic resin material constituting the base portion. With this configuration, strength and rigidity of the core base portion against the bending force can be increased, and insertability of the cleaning portion with respect to the interdental space can be improved. Moreover, since the rigidity of the core base portion can be increased, the depth of the recesses formed in the core base portion becomes difficult to deepen, and this is also preferable in preventing the occurrence of the stress concentration at the position where the core base portion recess is provided.

(Method for Manufacturing Interdental Cleaning Tool)

(20) Provided is a method for manufacturing an interdental cleaning tool that includes a base portion made of a synthetic resin; and a soft portion made of an elastomer that covers at least a part of the base portion, the base portion including a handle base portion and a core base portion having an elongated shaft-shape connecting continuously to a tip end portion of the handle base portion, the soft portion having at least a cleaning soft portion that covers the core base portion, the handle base portion constituting a handle portion serving as a grip, and the core base portion and the cleaning soft portion constituting a cleaning portion for interdental cleaning. Specifically, the method includes: a base portion molding step of supplying a synthetic resin material into a first molding space of a first die to form a base portion; and a soft portion molding step of placing the base portion molded in the base portion molding step in a second molding space of a second die for molding the soft portion, and filling the second molding space with an elastomeric material to form a soft portion in a state of holding the core base portion in a substantially central part of a cleaning soft portion molding portion by plural sets of holding pins paired between a first mold and second mold of the second die, the holding pins provided in the second die at intervals in a length direction of the second molding space. Further provided is a method for manufacturing an interdental cleaning tool, in which at least one set of the plural sets of holding pins are arranged at an interval in the length direction of the second molding space so as not to overlap each other in a circumferential direction of the second molding space. Note that one set of the holding pins paired between the first mold and second mold of the second die means, for example, holding pins of the first mold and the second mold, which are located at the same order positions counted from the tip end of the second molding space. In addition, "Not overlapping in the circumferential direction of the second molding space" means that two holding pins making a set are in a positional relationship of not colliding with each other even when the cleaning portion recesses of the holding pins are moved in the circumferential direction of the second molding space.

In this method for manufacturing an interdental cleaning tool, at least one set of the plural sets of holding pins are arranged at an interval in the length direction of the second molding space so as not to overlap each other in a circumferential direction of the second molding space. Accordingly, the core base portion recesses formed by the holding pins are alternately arranged in the length direction of the core base portion on the first side portion and second side portion of the core base portion, and a pair of the core base portion recesses are prevented from being formed at the same axial position of the core base portion. Therefore, the cross-sectional area of the core base portion at the position corresponding to the core base portion recess is increased, and the occurrence of the breakage of the core base portion can be prevented. In addition, when the holding pins do not overlap each other in the circumferential direction of the second molding space, the holding pins of the first side portion and the second side portion apply a force to different positions of the core base portion, so that vibrations of the core base portion during molding of the soft portion can be suppressed, as compared with the case of the holding pins which overlap each other in the circumferential direction. Therefore, the depth of the formed core base portion recesses becomes shallow, the cross-sectional area of the core base portion at each of the positions corresponding to the core base portion recesses is increased, and the occurrence of the breakage of the core base portion can be prevented. Furthermore, since the interval between the holding pins with respect to the length direction of the core base portion is substantially shortened, it is possible to hold the core base portion satisfactorily stably.

(21) In the method for manufacturing an interdental cleaning tool according to (20), the plural sets of holding pins are individually arranged at interval in the length direction of the second molding space so as not to overlap each other in the circumferential direction of the second molding space. In this case, since all sets of the cleaning portion recesses formed by the holding pins can be individually formed at intervals in the axial direction of the cleaning portion so as not to overlap each other in the circumferential direction of the cleaning portion, the breakage of the cleaning portion can be prevented far more effectively. When only a part of the sets of the holding pins is formed at intervals in the length direction of the second molding space, it is preferable to form only the cleaning portion recesses at a spot where the stress concentration is liable to occur during the interdental cleaning at intervals in the axial direction of the cleaning portion.

(22) In the method for manufacturing an interdental cleaning tool according to (20) or (21), three or more holding pins are provided in at least either one of the first mold and second mold of the second die. With such a configuration, three or more cleaning portion recesses are formed on at least one of the first side portion and second side portion of the cleaning portion by the holding pins. Accordingly, in the interdental cleaning tool manufactured by this manufacturing method, the bending force acting on the cleaning portion at the time of the interdental insertion or during the interdental cleaning can be dispersed at three or more positions of the cleaning portion, at which the cleaning portion recesses are formed, and the breakage of the core base portion due to the local application of a large bending force can be prevented effectively. Moreover, when three or more holding pins are provided, the contact area of the holding pins with respect to the core base portion increases, the vibrations of the core base portion during molding of the soft portion can be suppressed, and the core base portion recesses to be formed can be suppressed from being deepened. Therefore, the depth of the core base portion recesses during the interdental cleaning is made shallow, whereby the occurrence of the stress concentration at the positions of the core base portion recesses during the interdental cleaning can be prevented effectively. Accordingly, this configuration is preferable. It should be noted that the number of the holding pins of the first mold and the second mold in the second die can be the same or different. For example, the number of the holding pins can be reduced by only one on the first mold than on the second mold.

(23) In the method for manufacturing an interdental cleaning tool according to any one of (20) and (22), an arrangement interval of the holding pins in the length direction of the second molding space is set to be substantially uniform or to become narrower as approaching to the tip end side of the second molding space in both of the first side portion and the second side portion, in each case where the holding pins are arranged at intervals in the length direction of the second molding space so as not to overlap each other in the circumferential direction of the second molding space, and where the holding pins which overlap each other in the circumferential direction of the second molding space are arranged. As mentioned above, the tip end portion of the cleaning portion is such a substantially linear and elongated shaft-shaped structure configured to have a smaller diameter than the base end portion, and is liable to structurally change with respect to a molding force when the cleaning soft portion is molded. In view of this, as in the present invention, the arrangement interval of the holding pins may be set so as to become narrower as approaching to the tip end side of the second molding space, or may be set to be substantially uniform. Then, it is easy to suppress the core base portion from moving from a predetermined position during molding of the soft portion. In particular, it is a most preferable embodiment to set the arrangement interval of the holding pins in the length direction of the second molding space to be substantially uniform. Such a configuration is more preferable since external force applied to the core base portion during the molding of the soft portion is likely to be uniform.

(24) In the method for manufacturing an interdental cleaning tool according to any one of (20) and (23), cross-sectional areas of the tip end portions of the plurality of holding pins and vicinities thereof are set to be substantially identical in size to one another, or are set to be smallest in the holding pin on the most tip end side of the second molding space, in each case where the holding pins are arranged at intervals in the length direction of the second molding space so as not to overlap each other in the circumferential direction of the second molding space, and where the holding pins which overlap each other in the circumferential direction of the second molding space are arranged. In other words, the passage area of the second molding space that molds the cleaning soft portion becomes narrower as approaching to the tip end side. Therefore, as in the present invention, the cross-sectional area (area of cross section perpendicular to the axial direction of each of the holding pins) of the tip end portion of the holding pin and the vicinity thereof is reduced, whereby the cross-sectional area of the entire holding pin can also be reduced. With this, the passage area can be set as large as possible, whereby a flow resistance of the elastomeric material can be set as small as possible. In addition, the influence of the Karman vortex, which is generated in the vicinity of each holding pin, on the molded product and the holding pin can be further suppressed, the holding of the core base portion can be improved, and the poor filling of the elastomeric material into the cleaning soft portion molding portion can be prevented. It should be noted that the cross-sectional area of the tip end portion of the holding pin has very little change in area due to shaking or expansion and shrinkage during molding, therefore, even if these factors are taken into consideration, it can be presumed that the cross-sectional area becomes substantially the same as an area of the opening portion of the cleaning portion recess to be formed thereby.

(25) In the method for manufacturing an interdental cleaning tool according to any one of (20) to (24), an elastomeric material is filled from the tip end side of the second molding space, or the elastomeric material is filled from the base end side of the second molding space.

(26) In the method for manufacturing an interdental cleaning tool according to any one of (20) to (25), the soft portion is molded by filling the second molding space with the elastomeric material in a state of holding the core base portion in the substantially central part of the cleaning soft portion molding portion with the holding pins so that a core base portion recess having a maximum depth of 0.01 mm or more and 0.085 mm or less is formed on the core base portion in the soft portion molding step, in each case where the holding pins are arranged at intervals in the length direction of the second molding space so as not to overlap each other in the circumferential direction of the second molding space, and where the holding pins which overlap each other in the circumferential direction of the second molding space are arranged.

With this configuration, the cross-sectional area of the core base portion at the forming position of the core base portion recess can be sufficiently ensured. Accordingly, the occurrence of stress concentration at the portion is suppressed, so that the breakage of the core base portion at the time of the insertion into the interdental space or during the interdental cleaning can be prevented. It should be noted that the maximum depth of the core base portion recess can be adjusted to a desired depth by adjusting the length of each of the holding pins or replacing the holding pin by that with different lengths as well as adjusting the load applied to the core base portion by the tip end portion of the holding pin as described above.

(27) In the method for manufacturing an interdental cleaning tool according to any one of (20) to (26), a maximum cross-sectional area of the core base portion at a position corresponding to the core base portion recess is set to 55.0 to 99.6%, preferably 70.0 to 99.0%, most preferably 80.0 to 97.9%, with respect to the cross-sectional area of the core base portion at a position adjacent to the core base portion recess, in each case where the holding pins are arranged at intervals in the length direction of the second molding space so as not to overlap each other in the circumferential direction of the second molding space, and where the holding pins which overlap each other in the circumferential direction of the second molding space are arranged. With this configuration, the stress concentration in each of the core base portion recesses during use is reduced, and the breakage of the core base portion at the time of the insertion into the interdental space or during the interdental cleaning can be prevented far more effectively.

(28) In the method for manufacturing an interdental cleaning tool according to any one of (20) to (27), a central segment of at least one set among the plural sets of holding pins paired between the first mold and the second mold in the second die is formed with an angle in the circumferential direction of the second molding space with respect to a mold opening and closing direction of the second die, in each case where the holding pins are arranged at intervals in the length direction of the second molding space so as not to overlap each other in the circumferential direction of the second molding space, and where the holding pins which overlap each other in the circumferential direction of the second molding space are arranged. With this configuration, in the case of forming a plurality of cleaning protrusions which protrude outward, in the cleaning soft portion, the degree of freedom in arrangement layout of the cleaning protrusions can be improved. In other words, the soft portion is molded in a state in which the core base portion is held in the central part of the second molding space with the plurality of holding pins. Since the positions of the holding pins can be adjusted in the length direction and the circumferential direction with respect to the second molding space so that the holding pins do not interfere with the forming positions of the cleaning protrusions, the degree of freedom in the arrangement layout of the cleaning protrusions can be improved.

(29) In the method for manufacturing an interdental cleaning tool according to any one of (20) to (28), at least either one of a fibrous material and talc is added to the synthetic resin material constituting the base portion. With such a configuration, the strength and rigidity of the core base portion against the bending force can be enhanced. Moreover, the rigidity of the core base portion can be increased, so that the depth of the core base portion recesses is preferably made shallow so as to prevent the occurrence of the stress concentration at the position where the core base portion recess is provided.

(30) In the method for manufacturing an interdental cleaning tool according to any one of (20) to (29), an interval between at least one set of the holding pins arranged at an interval in the length direction of the second molding space in the length direction of the second molding space is set to a length of not less than one fourth of a maximum axial length of the holding pins.

(31) In the method for manufacturing an interdental cleaning tool according to any one of (20) to (30), a cross section of at least one of the plurality of holding pins has a shape elongated in the length direction of the second molding space, in each case where the holding pins are arranged at intervals in the length direction of the second molding space so as not to overlap each other in the circumferential direction of the second molding space, and where the holding pins which overlap each other in the circumferential direction of the second molding space are arranged. In this manufacturing method, an increase in the width of the cleaning portion recess along the circumferential direction of the cleaning portion is avoided, and the degree of freedom in design of the arrangement layout of the protrusions in the case of providing the protrusions in the cleaning soft portion can be improved. In addition, the holding pins of the first side portion and the second side portion with respect to the core base portion apply forces to different positions of the core base portion, the vibrations of the core base portion during molding of the soft portion can be suppressed as compared with the case of circular holding pins with the same area. Therefore, the occurrence of the stress concentration at the position where the core base portion recess is provided is avoided, and the core base portion can be effectively prevented from being broken at the time of the insertion into the space between the teeth or during the interdental cleaning.

(32) In the method for manufacturing an interdental cleaning tool according to (31), a maximum length of the cross section of the holding pin along the length direction of the second molding space, the holding pin having a shape elongated in the length direction of the second molding space, is set to 0.4 mm or more and 1.5 mm or less, or 0.6 mm to 1.0 mm or less.

(33) In the method for manufacturing an interdental cleaning tool according to (31) or (32), a cross-sectional area of the holding pin having the shape elongated in the length direction of the second molding space is set to 0.15 mm$^2$ or more and 0.6 mm$^2$ or less, or 0.2 mm$^2$ or more and 0.4 mm$^2$ or less.

(34) In the method for manufacturing an interdental cleaning tool according to any one of (31) to (33), the holding pins having the shape elongated in the length direction of the second molding space are individually formed in the first mold and second mold of the second die so as to correspond to predetermined spots within a range of 5.5 mm to 7.0 mm from the tip end of the core base portion.

(35) In the method for manufacturing an interdental cleaning tool according to any one of (31) to (34), the cross section of the holding pin having the shape elongated in the length direction of the second molding space and an opening shape of the core base portion recess elongated in the axial direction and formed by the holding pin are a shape elongated in a spiral direction of the cleaning portion shaft such as an elliptical shape, an oblong shape, a rectangular shape, an egg shape, an oval shape and a bale shape (rectangular shape with curved short side portions, rectangular shape with rounded corners), a teardrop shape, and a parallelogram shape.

(36) In the method for manufacturing an interdental cleaning tool according to any one of (20) to (35), with regard to at least one holding pin among the holding pins and a holding pin that supports a region where an angular position in the circumferential direction is shifted by 90 degrees or more with respect to an outer peripheral region of the core base portion supported by the holding pin, respective tip end supporting surfaces of the holding pins are formed into a recessed shape, in which a central part is a recessed as compared with both side parts when viewed from the axial direction of the cleaning soft portion molding portion and has a region that abuts against an outer surface of the core base portion at least on both side portions from the beginning, in each case where the holding pins are arranged at intervals in the length direction of the second molding space so as not to overlap each other in the circumferential direction of the second molding space, and where the holding pins which overlap each other in the circumferential direction of the second molding space are arranged.

In this manufacturing method, a supporting form of the core base portion by the holding pins keeps a stable state from the beginning of the contact without biting deep into the core base portion. Therefore, the core base portion is effectively suppressed from vibrating during filling with the elastomer, and is particularly held in a stable state without deviating in the direction perpendicular to the axis. As a result, a biting amount of the holding pin itself into the core base portion is also suppressed, and the recess formed by the holding pin can also be made shallow.

The recess formed by the conventional holding pin is deep, and particularly, one central spot corresponding to the central part of the tip end supporting surface of the holding pin becomes particularly deep. However, in the present invention, both side portions sandwiching the central part of the tip end supporting surface of the holding pin abut against the core base portion. Accordingly, the force is dispersed, and the recess does not become deep even in a part. As described above, in the present invention, the recess formed in the core base portion becomes shallow both partially and entirely. Accordingly, the force can be prevented from being concentrated on the forming position of this recess at the time of insertion into the space between the teeth or during the interdental cleaning. In this way, the core base portion can be prevented from being broken at the forming position of the recess when the bending force acts on the cleaning portion.

Further, the core base portion is held in a stable state without unnecessarily increasing the number and cross-sectional area of the holding pins, and such recesses to be formed can be made shallow. Therefore, the degree of freedom in design of the structure of the cleaning portion and the like can also be maintained.

(37) In the method for manufacturing an interdental cleaning tool according to (36), each of the tip end supporting surfaces is shaped such that the central part does not abut against the outer surface of the core base portion and maintains a gap with the outer surface from the beginning. In this manufacturing method, regardless of variations in molding dimensions of the core base portion and a degree of thermal expansion thereof the core base portion can be held surely in a more stable state.

Advantageous Effects of Invention

According to the interdental cleaning tool and the method for manufacturing the same in the present invention, at least one set of two cleaning portion recesses out of plural sets of the cleaning portion recesses, each pair of which is formed between the first side portion and the second side portion, are formed at an interval in the axial direction of the cleaning portion so as not to overlap each other in the circumferential direction of the cleaning portion. Accordingly, the core base portion recesses are formed alternately on the first side portion and second side portion of the core base portion during molding of the soft portion, and a pair of the core base portion recesses can be prevented from being formed at the same position in the axial direction of the core base portion. Therefore, a cross-sectional area of the core base portion at a position corresponding to each of the core base portion recesses is increased, and the occurrence of the breakage of the core base portion can be prevented. In addition, the positions in the axial direction of the core base portion, where the respective holding pins apply force to the core base portion, do not overlap each other, so that a portion in the axial direction of the core base portion, where the core base portion is subjected to the force, is longer than in the case of disposing the holding pins which overlap each other in the circumferential direction. As a result, the core base portion is more firmly held, and the core base portion recesses 14Ea formed during the molding of the soft portion 20 is suppressed from being deepened. Hence, the cross-sectional area of the core base portion 12 at each of the positions corresponding to the core base portion recesses 14Ea is increased, and the occurrence of breakage of the core base portion 12 can be prevented. Furthermore, the interval between the holding pins in the length direction of the core base portion is substantially shortened, thereby holding the core base portion satisfactorily stably.

BRIEF DESCRIPTION OF DRAWINGS

FIG. 2(a) is a front view of the interdental cleaning tool connected body, and FIG. 2(b) is a side view thereof.

FIG. 26 shows analysis results and the maximum stress values.

FIG. 27 shows analysis results and the maximum stress values.

FIG. 28 shows analysis results and the maximum stress values.

FIG. 29 shows analysis results and the maximum stress values.

FIG. 30 shows analysis results and the maximum stress values.

DESCRIPTION OF EMBODIMENTS

Hereinafter, embodiments of the present invention will be described with reference to the drawings.

<Interdental Cleaning Tool>

An interdental cleaning tool of the present invention includes a base portion made of a synthetic resin, and a soft portion made of an elastomer.

Examples of synthetic resin materials that can be used to form the base portion include thermoplastic synthetic resin materials, such as polypropylene (PP), polybutylene terephthalate (PBT), polyethylene, polyethylene terephthalate, polycyclohexylene dimethylene terephthalate, saturated polyester resins, polymethyl methacrylate, cellulose propionate, thermoplastic polyurethane, polyamide, polycarbonate, acrylonitrile butadiene styrene (ABS), and others. In addition, as a synthetic resin material constituting the base portion, it is preferable to adopt a thermoplastic synthetic resin material having crystallinity with a melting point of 150° C. or more in order to improve the productivity. In particular, polypropylene (PP), polybutylene terephthalate (PBT), and polyamide (PA) are preferred, which can prevent a base portion 10 from being broken. Polypropylene is most preferred, which can be molded at low temperatures, can reduce cycle time and improve the productivity, and imposes less heat load on molding equipment.

For the synthetic resin material constituting the base portion, in order to prevent breakage of a cleaning portion at the time of insertion into the interdental space or during interdental cleaning, powders such as plate-like or granular glass flakes, mica, and talc, and fibrous materials such as glass fibers, carbon fibers, and aramid fibers can be added.

Examples of the elastomers that can be used to form the soft portion include thermoplastic elastomers such as styrene elastomers, olefin elastomers, and polyamide elastomers, and thermosetting elastomers such as silicone rubbers, urethane rubbers, fluoro rubbers, natural rubbers, and synthetic rubbers. Particularly preferred are materials having compatibility with the synthetic resin material constituting the base portion. For example, when the base portion is made of polypropylene, the soft portion should preferably be made of a polyolefin-based elastomer or a styrene-based elastomer. As the elastomer, one to which an additive is added can also be adopted.

Next, a specific shape of an interdental cleaning tool 1 will be described with reference to the drawings.

Figure 1:
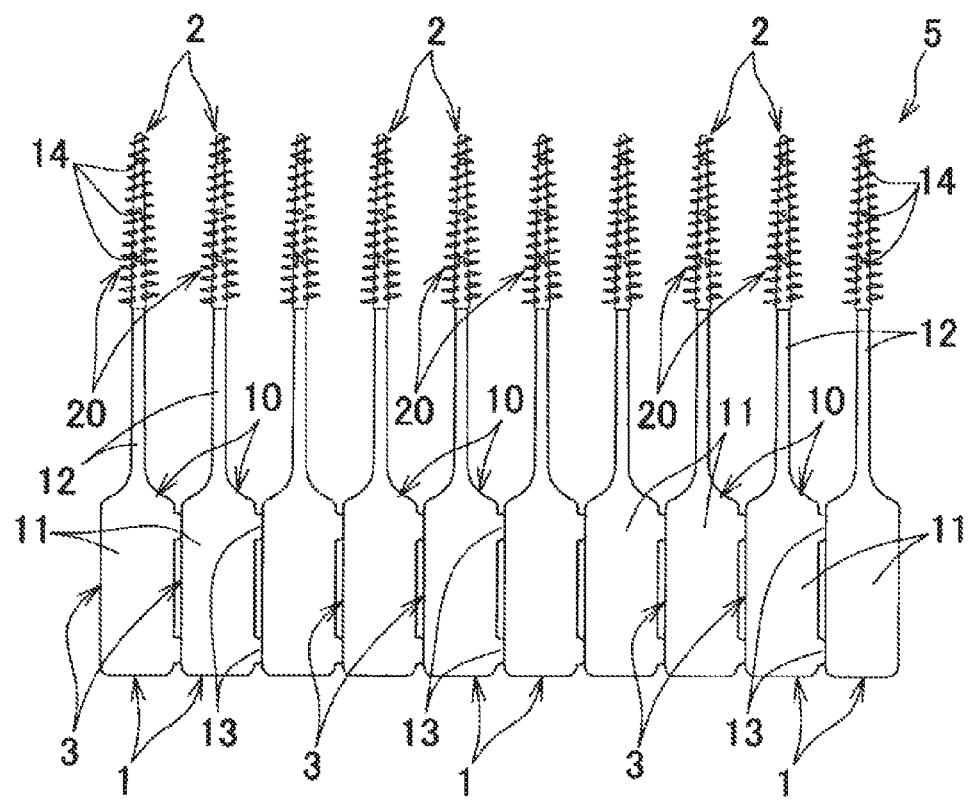
FIG. 1 is a front view of an interdental cleaning tool connected body.
Figure 3:
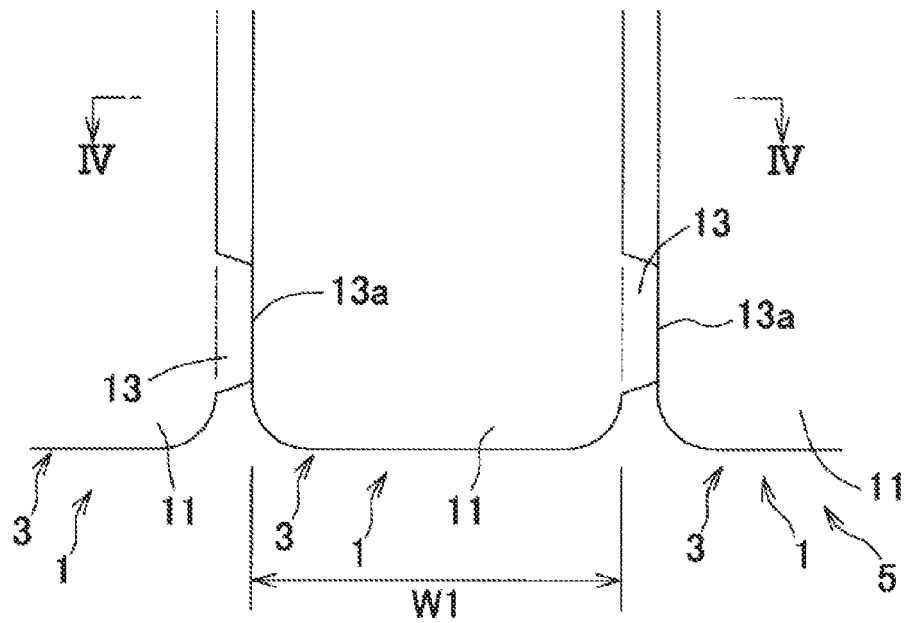
FIG. 3 is an enlarged front view of the vicinity of a connecting portion of the interdental cleaning tool connected body.
Figure 4:
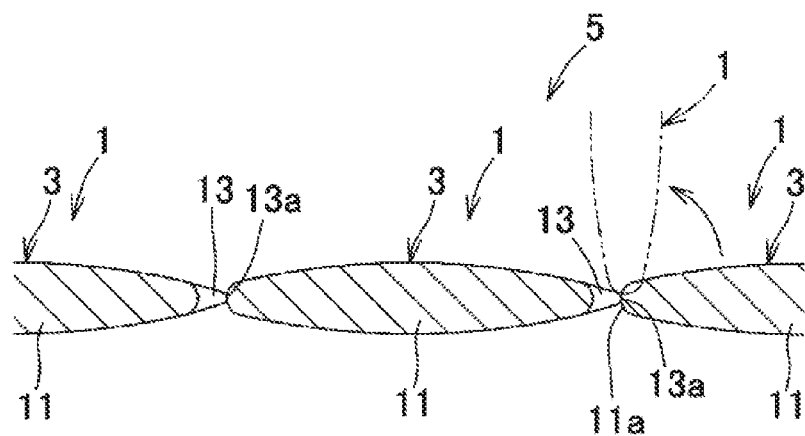
FIG. 4 is a cross-sectional view taken along line IV-IV of FIG. 3.

As shown in FIG. 1, FIG. 2A, FIG. 2B, FIG. 3, FIG. 4, FIG. 5A, FIG. 5B and FIG. 6, the interdental cleaning tool 1 includes a cleaning portion 2 for interdental cleaning and a handle portion 3 as a grip, which are distinguishable in terms of function, and also includes the base portion 10 made of a synthetic resin and a soft portion 20 made of an elastomer, which are distinguishable in terms of material. As shown in FIG. 1, FIG. 2A, FIG. 2B and FIG. 3, such interdental cleaning tools 1 are manufactured in the form of an interdental cleaning tool connected body 5, which includes a plurality of interdental cleaning tools 1 separably connected in parallel to one another. A user disconnects the interdental cleaning tools 1 one by one at connecting portions 13 from one side of the interdental cleaning tool connected body 5, so as to sequentially use them. Although FIG. 1 illustrates that ten interdental cleaning tools 1 are connected in parallel to form the interdental cleaning tool connected body 5, any number of interdental cleaning tools 1 may be connected.

(Base Portion)

The base portion 10 is made of a thermoplastic synthetic resin. As shown in FIG. 1, FIG. 2A, FIG. 2B, FIG. 3, FIG. 4, FIG. 5A, FIG. 5B and FIG. 6, the base portion 10 includes: a handle base portion 11 that has a flat elongated plate shape and forms the handle portion 3; a core base portion 12 that is connected to a tip end portion of the handle base portion 11 and has an elongated shaft shape; and the connecting portions 13 separably connecting the adjacent handle base portions 11.

The handle base portion 11 is formed in a flat elongated plate shape. However, the handle base portion 11 may have any shape other than the flat elongated plate shape as long as the shape facilitates gripping by fingers and interdental cleaning. For example, the handle base portion 11 can be formed into a rod shape, a plate shape, or a continuous or stepwise curved shape, in which a cross-sectional shape is formed to be a circular shape, an oval shape (an elliptical shape, an oblong shape, a rounded rectangular shape, an egg shape, an oval shape (Japanese old coin shape), a bale shape (rectangular shape with curved short side portions, rectangular shape with rounded corners), etc.), a teardrop shape and a polygonal shape. In addition, the handle base portion may be provided with a curved portion or a recess for improving ease of holding. The tip end portion of the handle base portion 11 becomes narrower in width as approaching to the core base portion 12 side, and is smoothly connected to the core base portion 12. The handle base portion 11 may have any dimensions capable of facilitating the gripping by fingers and the interdental cleaning. For example, the handle base portion 11 illustrated in FIG. 1, FIG. 2A and FIG. 2B has a length L1 of 1.0 mm to 25 mm, a width W1 of 4 mm to 8 mm, and a gripping-portion thickness t1 of 1.0 mm to 2.0 mm. In this manner, since the handle base portion 11 is made thin, there is less unevenness in dimension due to shrinkage of the handle base portion 11 when molding the base portion 10. In addition, occurrence of sink marks is prevented, and loading defects of the base portion 10 into second dies 40 and 41 for molding the soft portion 20 can be prevented.

The core base portion 12 is formed in a substantially linear elongated shaft shape, and the handle base portion 11 and the core base portion 12 are disposed substantially in the identical axis line, and the core base portion 12 and the handle base portion 11 are disposed in the identical plane. An exposed portion 12a exposed to the outside is formed on a gripping portion side of the core base portion 12. A core main body 12b which is covered with an elastomer and is insertable between the teeth is formed at a tip end side portion of the core base portion 12. At least a portion of the core main body 12b, which is covered with the soft portion, is formed in a gentle tapered shape to decrease in diameter as approaching to the tip end side. In addition, the portion which is not covered with the soft portion may not necessarily be linear, and for example, a shape bent continuously or stepwise may be adopted.

In view of operability, a length L2 of the exposed portion 12a of the core base portion 12 from an end point of a round portion (curved portion) on a side surface of the tip end portion of the handle base portion 11, which is configured to be narrow, to a base end portion of a covering portion 21a of the soft portion 20 is set to be, for example, 10 mm to 40 mm, preferably 10 mm to 30 mm, more preferably 10 mm to 25 mm, most preferably 10 mm to 20 mm. In view of interdental cleaning performance, a length L3 of a cleaning soft portion 21 is set to be, for example, 12 mm to 22 mm. From viewpoints of insertability and relaxation of stress concentration, a cross-sectional shape of the core base portion 12 is preferably circular, but may be a cross-sectional shape such as an oval shape, a teardrop shape or a polygonal shape.

In view of such insertability into the space between the teeth, the tapered shape of the outer surface of the core base portion 12 makes an angle θ1 of 0.2° to 1.5° with a center line of the core base portion 12. The tip end portion of the core main body 12b has a diameter of 0.4 mm to 0.6 mm. The base end portion of the core main body 12b has a diameter of 0.8 mm to 2.0 mm. A curved surface end of the tip end portion of the covering portion 21a of the cleaning soft portion 21 has a diameter D of 0.5 to 1.2 mm. The core main body 12b is so formed that the tip end portion with a length by at least 5 mm from the tip end is reliably insertable between the teeth.

In this case, the angle θ1 of the tapered shape of the core base portion 12 is constant over the entire length of the core base portion 12. Alternatively, the angle θ1 may also be continuously or stepwise reduced toward the tip end side of the core base portion 12. In addition, the exposed portion 12a may be formed in a shaft shape with a constant diameter over its entire length, and only the core main body 12b may be gently tapered to decrease in diameter as approaching to the tip end side. Alternatively, the exposed portion 12a may also be omitted, and the core main body 12b may be connected directly to the handle base portion 11.

In the present embodiment, the present invention is applied to the I-type interdental cleaning tool 1 in which the handle base portion 11 and the core base portion 12 are disposed substantially in the identical axial line. The present invention can also be applied to a so-called L-shaped interdental cleaning tool 1 that includes the core base portion 12 a center line of which is inclined at an angle of for example, 120° with respect to a center line of the handle base portion 11, and to a curve-shaped interdental cleaning tool in which a handle portion connected to a cleaning portion has a smooth curved shape of about 140° to 160°.

As shown in FIG. 2A, FIG. 2B, FIG. 3 and FIG. 4, each of the connecting portions 13 between the adjacent handle base portions 11 is integrally formed with the handle base portions 11. A pair of the connecting portions 13 are provided at the base end portion side and the tip end portion side of each of the handle base portions 11 with a certain spacing therebetween in the length direction. The connecting portions 13 are elongated in the length direction of the handle base portion 11, and are formed into a trapezoidal shape (isosceles trapezoidal shape in FIG. 3) in front view. The number of the connecting portions 13 can be arbitrarily set, and only one can be provided. However, with such a configuration, when the interdental cleaning tool 1 is manufactured, connecting strength of the adjacent base portions 10 cannot be sufficiently ensured. Then, when the mold is opened after the molding of the base portions 10, the connecting portions 13 are ruptured, the base portions 10 may be broken, and the soft portions 20 cannot be molded. In addition, the connecting portions 13 may be bent, and the base portions 10 cannot be loaded in an appropriate position of a second molding space 42 (see FIG. 14) for molding the soft portions 20, and molding defects may occur. Therefore, two or more of the connecting portions 13 are preferably provided at intervals in the length direction of the handle base portion 11.

The connecting portions 13 are configured in the following manner. A cross section of the connecting portions 13 is formed in a trapezoidal shape or a triangular shape (isosceles trapezoidal shape or isosceles triangular shape in FIG. 4). Then, as shown by a virtual line in FIG. 4, bending force is concentrated on boundary portions 13a by allowing the interdental cleaning tool 1 to pivot in such a direction that the interdental cleaning tools 1 adjacent to each other overlap each other, around the boundary portions 13a. In addition, each circular-arc side surface 11a on a side edge of the handle base portion 11 comes into contact with the outer surfaces of the connecting portions 13. In this way, large force in a direction to pull apart the side surface 11a from the boundary portion 13a is applied by the lever principle. As described above, the interdental cleaning tool 1 can be completely separated at the boundary portions 13a without large deformation of the connecting portion 13. Here, the shape of the connecting portions 13 can be formed arbitrarily as long as the connecting portions 13 are configured to be capable of easily and completely separating the interdental cleaning tools 1 from each other by allowing the interdental cleaning tool 1 to pivot in such a direction that the interdental cleaning tools 1 adjacent to each other overlap each other, around the connecting portions 13.

When fibrous materials are added to the synthetic resin material constituting the base portions 10, the length direction of the fibrous materials is preferably oriented in a direction along the length direction of the base portion 10. This configuration makes it possible to improve the bending strength or axial buckling strength of the base portion 10 and to effectively prevent the core base portion 12 from breakage or buckling during use of the interdental cleaning tool 1. Further, by adding the fibrous materials as described above and powders such as plate-like or granular glass flakes, mica, and talc, a biting amount of a holding pin which bites into the core base portion 12 can be reduced, and a recess 14a of the formed core base portion 12 can be made shallow.

(Soft Portion)

As shown in FIG. 1, FIG. 2A, FIG. 2B, FIG. 3, FIG. 4, FIG. 5A, FIG. 5B and FIG. 6, the soft portion 20 is molded so as to be integrated with the base portion 10 using an elastomeric material, and includes the cleaning soft portion 21 externally mounted on the core base portion 12. Here, for the soft portion 20, it is possible to provide an insertion restriction portion having an annular shape for restricting the interdental insertion at the base end portion of the core main body 12b, or to provide a non-slip portion in which all or a part of the surface of the handle base portion 11 is covered with an elastomer. Although it is also possible to mold the insertion restriction portion and the non-slip portion independently of the cleaning soft portion 21, it is preferable to form the insertion restriction portion and the non-slip portion so as to be continuous with the base portion of the cleaning soft portion 21 since a structure of the dies becomes complicated.

The cleaning soft portion 21 includes the covering portion 21a with which the core base portion 12 is covered, and a plurality of cleaning protrusions 21b protruding outward from the covering portion 21a at intervals in the length direction.

If a thickness of the covering portion 21a is too large, it is necessary to reduce a diameter of the core main body 12b covered with the covering portion 21a. This undesirably reduces the rigidity of the cleaning portion 2 significantly during the insertion between teeth, and raises the possibility of occurrence of Karman vortex at the time of molding the cleaning soft portion 21, which causes the cleaning portion 2 to be subject to a significant influence of the Karman vortex. If the thickness of the covering portion 21a is too small, the elastomeric material cannot be filled up to the base end portion of the cleaning portion 2 undesirably. Therefore, the thickness of the covering portion 21a is preferably set at 0.1 mm to 0.2 mm.

The cleaning protrusions 21b are formed apart from one another in the length direction of the covering portion 21a, and are also arranged at intervals from one another in the circumferential direction of the covering portion 21a. More specifically, in order to make it possible to mold the cleaning protrusions 21b with the second dies 40 and 41 which will be described later, in the circumferential direction of the covering portion 21a, totally six types of the cleaning protrusions 21b are arranged at intervals from one another in the length direction of the covering portion 21a. The six types include: a set of the two cleaning protrusions 21b protruding from the covering portion 21a to one side in the mold opening and closing direction; a set of the two cleaning protrusions 21b protruding from the covering portion 21a to the other side in the mold opening and closing direction; one cleaning protrusion 21b protruding to one side along mating surfaces 40a and 41a from the covering portion 21a; and one cleaning protrusion 21b protruding to the other side along the mating surfaces 40a and 41a from the covering portion 21a. Here, it is also possible to form the cleaning protrusions 21b in an arrangement pattern other than the above-described one. For example, it is also possible to provide a set of four cleaning protrusions 21b protruding outward from the covering portion 21a in a cross shape, at intervals in the axial direction.

A cross-sectional area, length, number, and arrangement interval of the base end portion of the cleaning protrusions 21b can be arbitrarily set, but in view of moldability and cleaning performance, the cross-sectional area of the base end portion of the cleaning protrusion 21b is preferably set to 0.03 mm$^2$ to 1.5 mm$^2$, more preferably 0.03 mm$^2$ to 1.0 mm$^2$, and most preferably 0.04 mm$^2$ to 0.8 mm$^2$. The length of the cleaning protrusions 21b is preferably set to 0.1 mm to 2.5 mm, more preferably 0.3 mm to 2.0 mm, and most preferably 0.5 mm to 1.7 mm. The number of the cleaning protrusions 21b is preferably set to 20 to 100, and the arrangement interval of the cleaning protrusion 21b is preferably set to 0.5 mm to 1.5 mm. In addition, although conical protrusions are adopted as the cleaning protrusions 21b, protrusions having a tapered axially flat plate shape can also be adopted. Further, as the cross-sectional shape of the cleaning protrusions 21b, an arbitrary sectional shape such as an oval shape, a teardrop shape and a polygonal shape can be adopted, in addition to the circular shape.

When the soft portion 20 is molded, in order to position and hold the core base portion 12 within the central part of the second molding space 42 with a plurality of holding pins 50 to 52 provided in the second dies 40 and 41, as described later, cleaning portion recesses 14 which correspond to the holding pins penetrate the covering portion 21a and form core base portion recesses 14a in the core base portion 12 are formed. The cleaning portion recesses 14 are formed on a first side portion (left half of the cleaning portion 2 in FIG. 5(b)) of the cleaning portion 2 and on a second side portion (right half of the cleaning portion 2 in FIG. 5(b)). Two or more of the cleaning portion recesses 14 are formed at intervals in the axial direction of the cleaning portion 2. At least one set of two cleaning portion recesses 14 out of plural pairs of the cleaning portion recesses 14 which form a pair of the first side portion and the second side portion, are formed at an interval in the axial direction of the cleaning portion 2 so as not to overlap each other in the circumferential direction of the cleaning portion 2. The core base portion recesses 14a are formed such that the base portion 10 with relatively high temperature immediately after being molded by first dies 30 and 31 is softened by exposure to heat of the elastomer filled in the second dies 40 and 41, and that tip end portions of the holding pins abut against the softened core base portion 12.

Here, the first side portion and second side portion of the cleaning portion 2 refer to a portion of the cleaning portion 2, which is molded with the second die 40, and a portion of the cleaning portion 2, which is formed by the second die 41. The first side portion and the second side portion mean a front side half portion and back side half portion of the cleaning portion 2, which correspond to the front side and back side of the handle base portion 11 having a flat shape. The cleaning portion recesses 14 which form a pair of the first side portion and the second side portion mean cleaning portion recesses 14 located at the same order positions counted from the tip end of the cleaning portion 2 in the first side portion and the second side portion.

Figure 6:
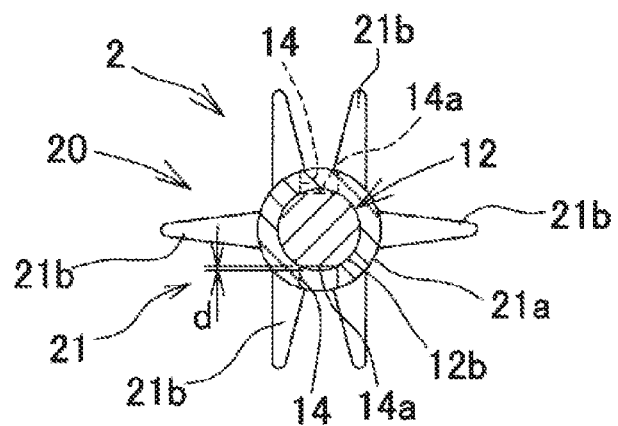
FIG. 6 is a cross-sectional view taken along line VI-VI of FIG. 5(a).

As shown in FIG. 6, a maximum depth d of each of the core base portion recesses 14a from an outer peripheral surface of the core base portion 12 can be arbitrarily set. However, the maximum depth d is desirably set to 0.01 mm or more and 0.085 mm or less, and preferably 0.01 mm or more and 0.065 mm, in order to prevent the breakage of the core base portion 12 due to an occurrence of a concentration of a large stress at the forming position of the core base portion recess 14a when bending force is applied to the cleaning portion 2 at the time of inserting the cleaning portion 2 into the interdental space or during interdental cleaning by the cleaning portion 2. With respect to the cross-sectional area of the core base portion 12 at a position adjacent to the core base portion recess 14a, a maximum cross-sectional area of the core base portion 12 at the position corresponding to the core base portion recess 14a is set to 55.0 to 99.6%, preferably 70.0 to 99.0%, more preferably 80.0 to 97.9%, most preferably 90.0 to 97.9%. The occurrence of the stress concentration on the core base portion recess 14a is reduced, and the breakage of the core base portion 12 at the time of inserting into the interdental space or during the interdental cleaning can be prevented more effectively.

A front of the cleaning portion recess 14 is formed in the same shape as a pin tip shape of the holding pin, and is formed into a shape elongated in a spiral direction of the cleaning portion shaft, such as a parallelogram shape, a polygonal shape such as a square or rectangular shape, a circular shape, an oval shape, a teardrop shape and the like. All of the plurality of cleaning portion recesses 14 provided in the interdental cleaning tool 1 may be formed in the same shape, or those in different shapes according to distances from the tip end portion of the cleaning portion 2 can also be arbitrarily combined and mixed with one another.

In the case of forming the cleaning portion recess 14 to have a shape elongated in the axial direction of the cleaning portion, such as an oval shape, a teardrop shape, and a rectangular shape, the cleaning portion recess 14 can be configured as follows. Here, other configurations can be configured similarly to the interdental cleaning tool 1.

Figure 7:
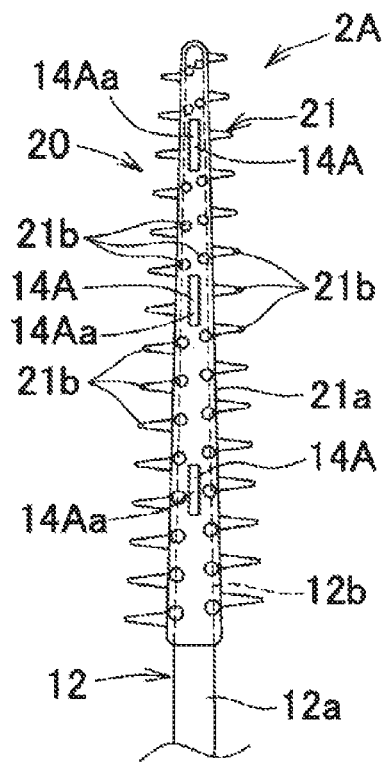
FIG. 7 is an enlarged front view of a cleaning portion of another configuration.
Figure 20:
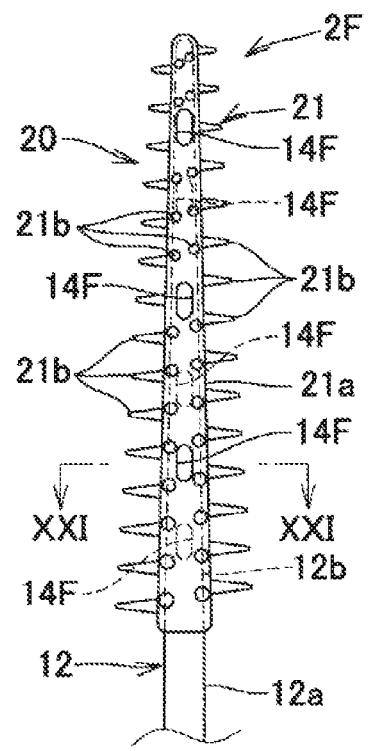
FIG. 20(a) is a front view of a cleaning portion of another configuration.
FIG. 20(b) is a side view thereof.
Figure 20:
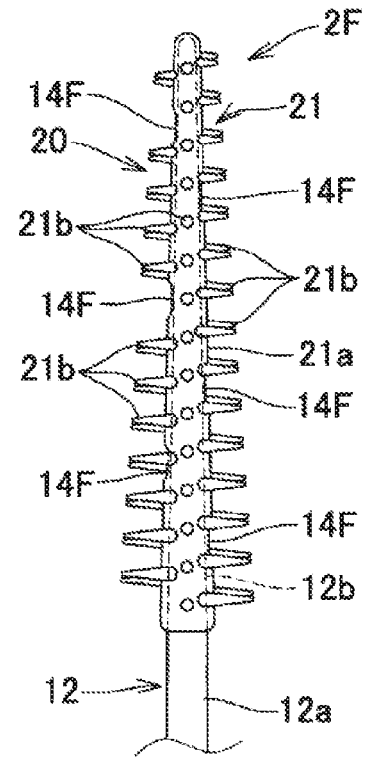
Figure 21:
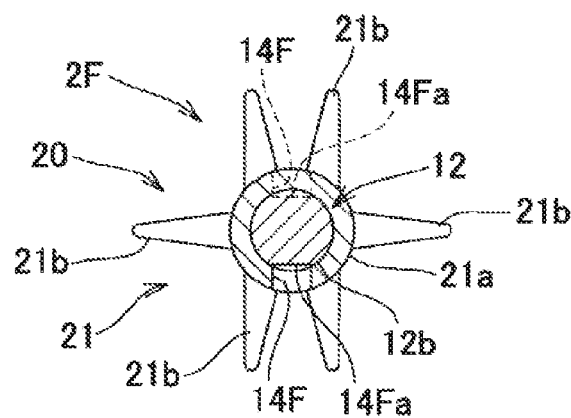
FIG. 21 is a cross-sectional view taken along line XXI-XXI of FIG. 20(a).

In a cleaning portion 2F illustrated in FIG. 20A, FIG. 20B and FIG. 21, instead of the cleaning portion recesses 14, cleaning portion recesses 14F having a front shape that is elongated in the axial direction of the cleaning portion 2F, specifically, a bale shape (having a rectangular shape with curved short side portions, rectangular shape with rounded corners), are formed. In each of the cleaning portion recesses 14F, the pin tip shape of the holding pin is formed into a bale shape (rectangular shape with curved short side portions, rectangular shape with rounded corners), whereby the cleaning portion recess 14F is formed between cleaning protrusions 21b adjacent to one another in the circumferential direction so that a length direction of the cleaning portion recesses 14F can coincide with the axial direction of the cleaning portion 2. However, besides the bale shape (rectangular shape with curved short side portions, rectangular shape with rounded corners), it is possible to adopt a rectangular shape as in a cleaning portion recess 14A of a cleaning portion 2A shown in FIG. 7, an elliptical shape, or other shapes. Further, all of the plurality of cleaning portion recesses 14 provided in the interdental cleaning tool 1 can be formed in the same shape as in this embodiment, or those in different shapes according to distances from the tip end portion of the cleaning portion 2 can also be arbitrarily combined and mixed with one another.

Figure 22:
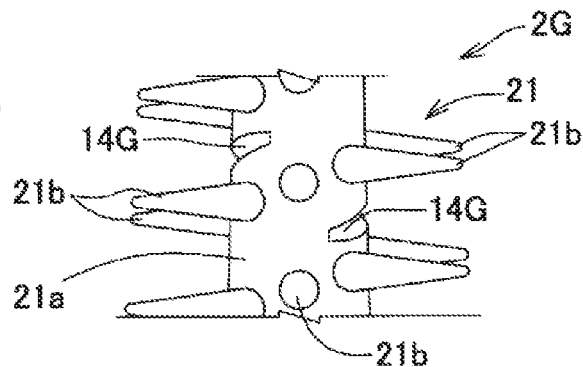
FIG. 22(a) is a front view of a cleaning portion of another configuration.
FIG. 22(b) is a side view thereof.
FIG. 22(c) is a cross-sectional view taken along line XXII-XXII of FIG. 22(a).
Figure 22:
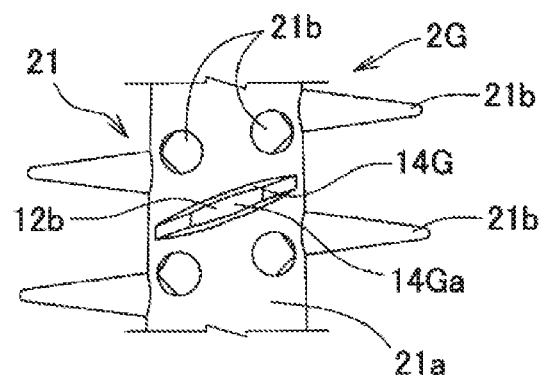
Figure 22:
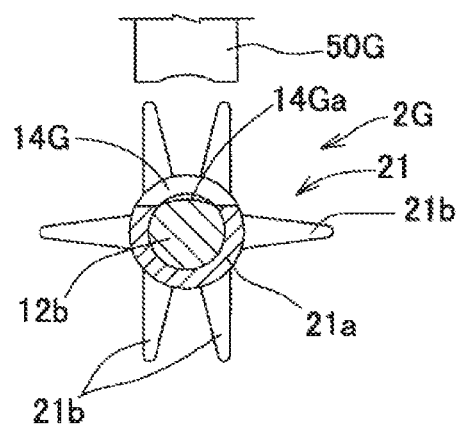

In this way, if each of the cleaning portion recesses 14 is configured to have an elongated shape in the axial direction, a width of the cleaning portion recess 14 (the width along the circumferential direction of the cleaning portion) is small as compared to a circular cleaning portion recess formed by a circular holding pin having the same cross-sectional area as the cleaning portion recesses 14F and 14A. As a result, the concentration of the stress in the vicinity of the cleaning portion recess when the same force is applied is alleviated, so that the effect of preventing the breakage of the core base portion is obtained. Further, the pin tip shape of the holding pin having an elongated shape in the axial direction has a longer length in the cleaning axis direction than the circular holding pin having the same cross-sectional area. During the molding of the soft portion, the holding pin having an elongated shape in the axial direction has stronger holding force for the core base portion 12 than the circular holding pin, and accordingly, vibrations of the core base portion during the molding of the soft portion are suppressed, and a depth of each of core base portion recesses 14Aa becomes difficult to deepen. In this way, the stress generated at the position where the core base portion recess 14Aa is provided can be alleviated, and the effect of preventing the breakage of the core base portion is obtained. As in the case of a cleaning portion 2G shown in FIG. 22A, FIG. 22B and FIG. 22C, instead of the cleaning portion recess 14, a cleaning portion recess 140 having a long front shape can also be formed at an angle in an axial direction of the cleaning portion 2G (in a spiral direction of the cleaning portion shaft). The cleaning portion recess 14G can be formed by a holding pin 50G having a plate-shape as shown in FIG. 22A, FIG. 22B and FIG. 22C.

As in the cleaning portions 2A, 2F and 2G shown in FIG. 7, FIG. 23, FIG. 25A, FIG. 25B and FIG. 25C, when the core base portion recesses 14Aa, 14Fa and 14Ga are formed into the shape elongated in the axial direction of the cleaning portions 2A, 2F and 2G, an opening area of each of the core base portion recesses is desirably set to 0.15 mm$^2$ to 0.60 mm$^2$, preferably 0.17 mm$^2$ to 0.50 mm$^2$, more preferably 0.20 mm$^2$ to 0.40 mm$^2$, in order to prevent the breakage of the core base portion due to the occurrence of the concentration of the large stress at the forming position of the core base portion recess when the bending force is applied to the cleaning portion at the time of inserting the cleaning portion into the interdental space or during the interdental cleaning by the cleaning portion. In particular, the core base portion recess which is long in the axial direction is set to preferably 0.4 mm to 1.5 mm in maximum in the axial direction, more preferably 0.4 to 1.3 mm, more preferably 0.5 mm or more to 1.1 mm or less, most preferably 0.6 mm to 1.0 mm or less. The opening area of the core base portion recess is set to preferably 0.15 mm$^2$ to 0.6 mm$^2$, more preferably 0.17 mm$^2$ to 0.5 mm$^2$, and most preferably to 0.2 mm$^2$ to 0.4 mm$^2$. Further, it is preferable that a total area of the core base portion recesses formed in one interdental cleaning tool 1 be set to 0.90 mm$^2$ to 3.6 mm$^2$. The opening areas of all the core base portion recesses can be set to the same size, but it is preferable to set the opening areas so that the core base portion recess closer to the tip end side of the core base portion 12 has a smaller opening area.

Figure 8:
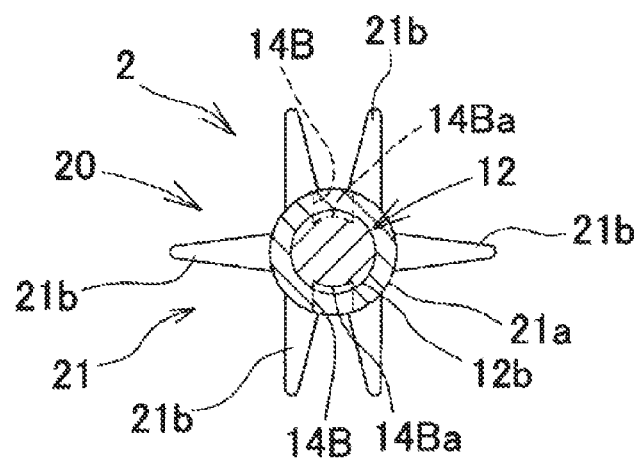
FIG. 8 is a view of a cleaning portion of another configuration, the view corresponding to FIG. 6.

A bottom surface of the core base portion recess 14a of the cleaning portion recess 14 reflects a shape of tip end supporting surfaces of the holding pins 50 to 52 which are described later. As shown in FIG. 6, the bottom surface is constituted by a flat surface in a direction perpendicular to the depth direction of the core base portion recess 14a. However, the bottom surface may be configured in a recessed shape having a central part that rises as compared with both side portions as viewed from the axial direction of the cleaning portion 2. For example, in a state in which the holding pin bites into the entire surface of the tip end supporting surface and abuts against the same like a core base portion recess 14Ca of a cleaning portion recess 14C shown in FIG. 9, the bottom surface can be formed into an inverted V-shaped mount shape in which the shape of the tip end supporting surface is directly transferred and the center is raised, so that a maximum depth of the recess 14Ca is set so as not to be at the central part of the recess 14Ca but to be at side positions sandwiching the central part, i.e., at the side end positions in this embodiment. Here, the bottom surface may have a shape that gently rises from both ends to the central part, and may have various other shapes, by changing the shape of the tip end supporting surface of the holding pin, for example, as shown in a core base portion recess 14Ba of a cleaning portion recess 14B in FIG. 8.

It is to be noted that, when the tip end portion of the holding pin to be described later does not completely bite into the core base portion and the central part of the tip end supporting surface of the holding pin does not contact the outer peripheral surface of the core base portion during the elastomer molding and maintains a gap therebetween, each of the core base portion recesses 14Ba and 14Ca is separated and formed into two parts with the central part interposed therebetween.

Figure 19:
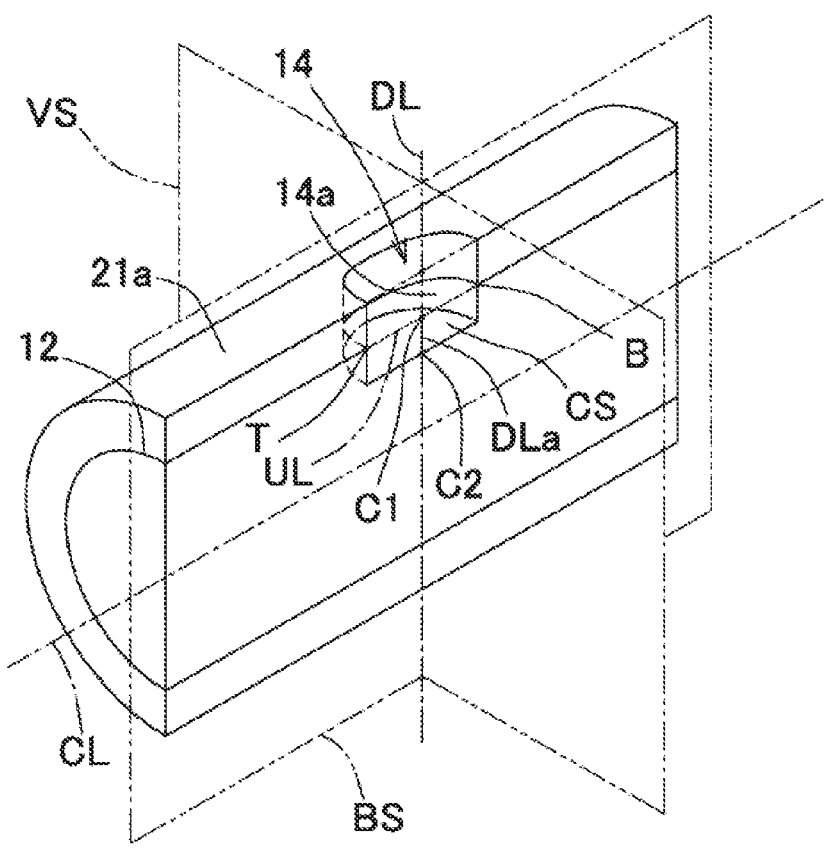
FIG. 19 is an explanatory view of a method for obtaining a maximum depth of a core base portion recess.

Although an opening area of the core base portion recess 14a can be arbitrarily set, the opening area is set to preferably 0.08 mm$^2$ to 0.35 mm$^2$, more preferably 0.09 mm$^2$ to 0.30 mm$^2$, and most preferably 0.1 mm$^2$ to 0.25 mm$^2$. A total area of the core base portion recesses 14a formed in one interdental cleaning tool 1 is set to preferably 0.048 mm$^2$ to 2.1 mm$^2$, more preferably 0.54 mm$^2$ to 1.8 mm$^2$, further preferably 0.60 mm$^2$ to 1.5 mm$^2$, most preferably 0.9 mm$^2$ to 1.3 mm$^2$. The opening areas of all the core base portion recesses 14a can be set to substantially the same size, but it is preferable to set the opening area so that the core base portion recess 14a on the tip end side of the core base portion 12 has a smaller opening area. Note that the opening area of the core base portion recess 14a means an area surrounded by a projected figure of a boundary line between the core base portion 12 exposed in the core base portion recess 14a, and the cleaning soft portion 21. The opening area is defined with respect to a plane perpendicular to the depth direction center line DL (see FIG. 19) of the core base portion recess 14a.

With regard to the cleaning portion recesses 14, as shown in FIG. 5A and FIG. 5B, all the cleaning portion recesses 14 which are paired with the first side portion and the second side portion can be formed at intervals in the axial direction of the cleaning portion 2 so as not to overlap one another in the circumferential direction of the cleaning portion 2. Alternatively, only specific cleaning portion recesses 14 which are paired with the first side portion and the second side portion can be formed at intervals in the axial direction of the cleaning portion 2 so as not to overlap one another in the circumferential direction of the cleaning portion 2, and the remaining cleaning portion recesses 14 can be provided so as to face each other with the core base portion 12 interposed therebetween or to be deviated in the axial direction of the cleaning portion 2 within the range equal to or less than the diameter of the cleaning portion recess 14.

The cleaning portion recesses 14 of the first side portion can be provided substantially at the central part of the arrangement interval of the cleaning portion recesses 14 of the second side portion in the axial direction. Alternatively, the cleaning portion recesses 14 of the first side portion can also be provided at positions biased toward the tip end side or base end side of the arrangement interval of the cleaning portion recesses 14 of the second side portion in axial direction. Here, it is preferable to set the arrangement interval of the cleaning portion recesses 14 to an interval of not less than one fourth of the maximum axial length of the cleaning portion recesses. Specifically, the cleaning portion recesses 14 of the first side portion are formed at least at a position of 1.0 to 2.5 mm, a position of 5.5 to 7.0 mm, and a position of 10.0 to 11.5 mm from the tip end portion of the cleaning portion 2, for example. Further, the cleaning portion recesses 14 of the second side portion are formed at a position of 1.4 to 3.7 mm, a position of 5.9 to 8.2 mm, and a position of 10.4 to 12.7 mm from the tip end portion of the cleaning portion 2, for example.

When a space between molars is cleaned, a large bending force tends to act on a region distant about 6 mm from the tip end portion of the cleaning portion 2. Therefore, it is preferable that at least the cleaning portion recesses 14 adjacent to the region be arranged to be shifted in the axial direction of the cleaning portion 2 so that the cleaning portion recesses 14 are not disposed in the region.

It is preferable that the number of sets of the cleaning portion recesses 14 be two or more, desirably three or more. In this way, the number of sets of the cleaning portion recesses 14 is set to three or more or four or more, whereby the stress generated by the bending force acting on the cleaning portion 2 at the time of the interdental insertion or during the interdental cleaning can be dispersed. In addition, as described later, the depth of the core base portion recesses 14a is made shallow while ensuring holding properties for the core base portion 12 by the holding pins 50 to 52, whereby the breakage of the core base portion 12 due to local concentration of a large stress can be effectively prevented during the interdental cleaning.

The number of the cleaning portion recesses 14 of the first side portion and the number of the cleaning portion recesses 14 of the second side portion are preferably the same, but can be differentiated from each other. For example, the number of the cleaning portion recesses 14 of the first side portion can be reduced by one than the number of the cleaning portion recesses 14 of the second side portion.

The arrangement interval of the cleaning portion recesses 14 of the first side portion and the second side portion in the axial direction of the cleaning portion 2 can be set to be substantially uniform or narrowed as approaching to the tip end side of the cleaning portion 2. The tip end portion of the cleaning portion 2 is a substantially linear and elongated shaft-shaped structure configured to have a smaller diameter than the base end portion, and is liable to structurally change with respect to the force applied by the molding when the cleaning soft portion 21 is molded. Therefore, as mentioned above, if the arrangement interval of the cleaning portion recesses 14 is set so as to become narrower as approaching to the tip end side of the cleaning portion 2 or is set to be substantially uniform, it is easy to suppress the core base portion 12 from moving from a predetermined position during molding of the soft portion 20. In particular, it is more preferable to set the arrangement interval to be substantially uniform since external force applied to the core base portion 12 at the time of molding the soft portion 20 is likely to be uniform.

In this interdental cleaning tool 1, the core base portion recesses 14a are formed alternately on the first side portion and second side portion of the core base portion 12 at intervals in the axial direction of the core base portion 12. In this way, the pair of core base portion recesses can be prevented from being formed at the same position in the axial direction of the core base portion 12. Therefore, the cross-sectional area of the core base portion 12 at each of the positions corresponding to the core base portion recesses 14a can be increased to prevent the core base portion 12 from being broken. In addition, since the positions in the axial direction of the core base portion, where the respective holding pins apply force to the core base portion, do not overlap each other, a portion in the axial direction of the core base portion, where the core base portion receives the force is longer than in the case of disposing the holding pins which overlap each other in the circumferential direction. As a result, the core base portion is more strongly held, and the core base portion recesses 14Ea formed during the molding of the soft portion 20 is suppressed from being deepened. Hence, the cross-sectional area of the core base portion 12 at each of the positions corresponding to the core base portion recesses 14Ea is increased, and the occurrence of breakage of the core base portion 12 can be prevented. Furthermore, since the interval between the holding pins 50 to 52 of the second die 40 and the interval between the holding pins 50 to 52 of the second die 41 in the length direction of the core base portion 12 are shortened, it is possible to hold the core base portion satisfactorily stably.

Arrangement positions of the cleaning portion recesses 14 with respect to the cleaning portion 2 can also be configured as follows. However, cleaning portion recesses 14D and 14E, and core base portion recesses 14Da and 14Ea are formed by changing only forming positions thereof with respect to the cleaning portion 2 from the cleaning portion recesses 14 and the core base portion recesses 14a, and the front shape, depth, and opening area of each of the core base portion recesses can be configured similarly to the cleaning portion recesses 14 and the core base portion recesses 14a.

Figure 10:
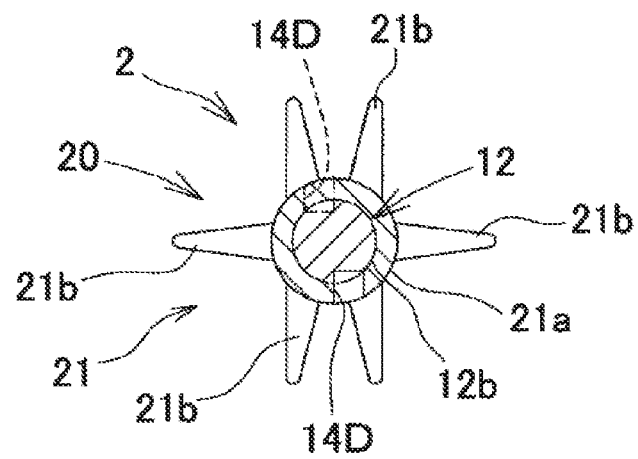
FIG. 10 is a view of a cleaning portion of another configuration, the view corresponding to FIG. 6.

As in cleaning portion recesses 14D of a cleaning portion 2D shown in FIG. 10, the cleaning portion recesses 14D can also be formed so that a center line of the cleaning portion recess 14D of the first side portion and the center line of the cleaning portion recess 14D of the second side portion are arranged in parallel so as to be shifted by a predetermined distance in a radial direction of the cleaning portion 2D.

Figure 11:
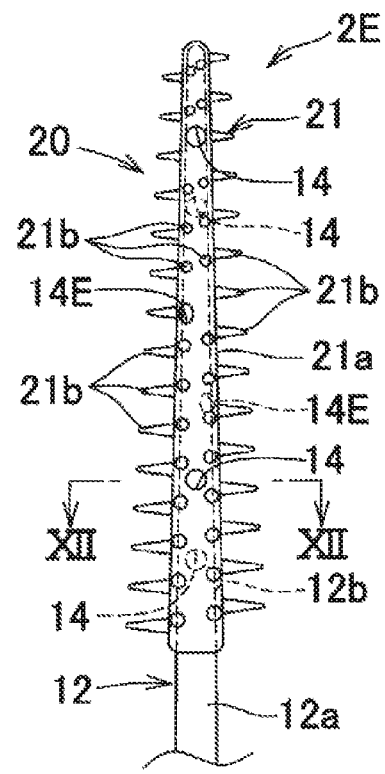
FIG. 11 is an enlarged front view of a cleaning portion of another configuration.
Figure 12:
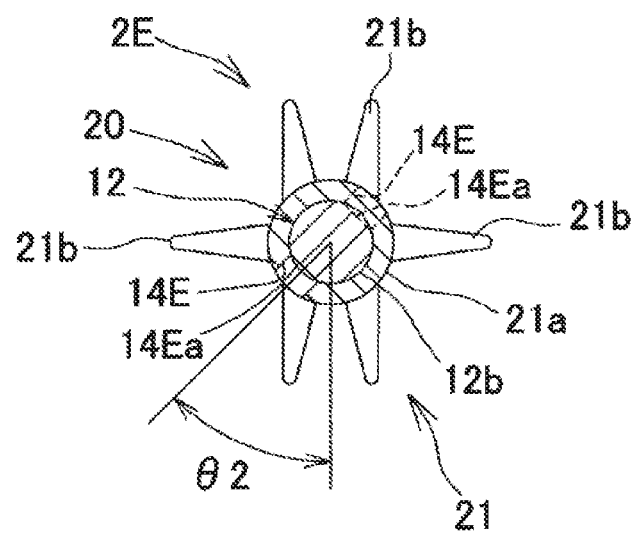
FIG. 12 is a cross-sectional view taken along line XII-XII of FIG. 11.
Figure 14:
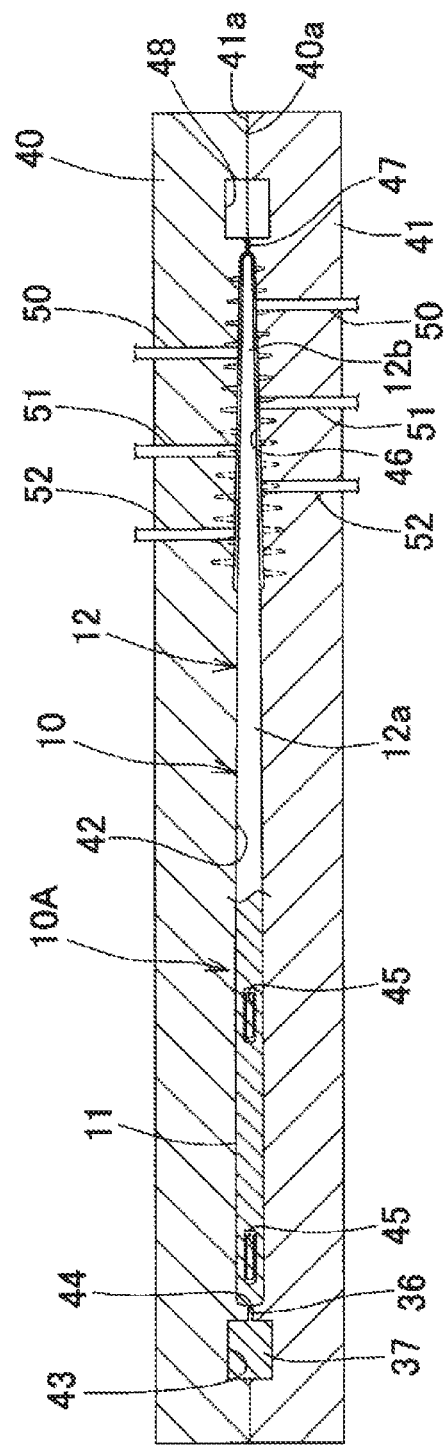
FIG. 14 is an explanatory view of a method of molding a soft portion with a second die.

Like the cleaning portion recesses 14E and core base portion recesses 14Ea of a cleaning portion 2E shown in FIGS. 11 and 12, the cleaning portion recess 14E and core base portion recess 14Ea of the first side portion and the cleaning portion recess 14E and core base portion recess 14Ea of the second side portion can also be arranged so as to face each other with a core base portion 12E interposed therebetween, and to allow the depth direction (DL in FIG. 19) of the cleaning portion recess to be inclined at an angle θ2 in the circumferential direction with respect to the mold opening and closing direction of the second dies 40 and 41 (see FIG. 14).

Figure 5:
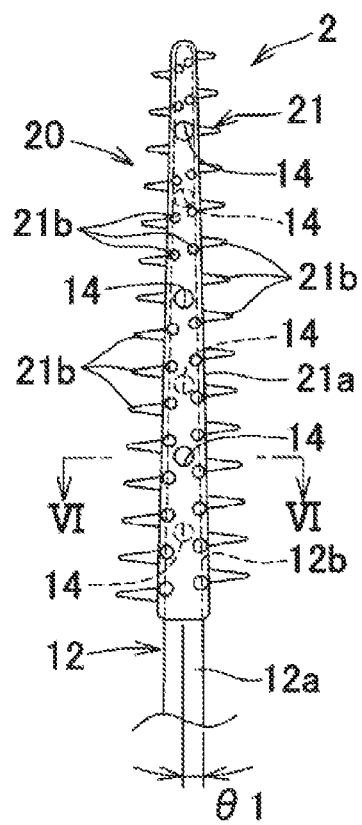
FIG. 5(a) is an enlarged front view of a cleaning portion, and FIG. 5 (b) is an enlarged side view thereof.
Figure 5:
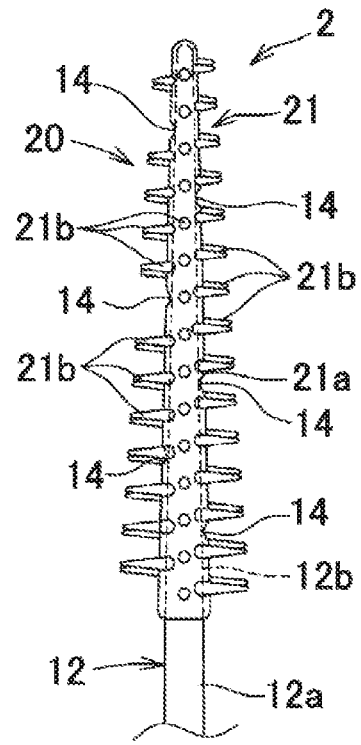

In the cleaning portion 2E shown in FIG. 11, only a second set of the cleaning portion recesses 14 from the tip end of the cleaning portion 2 shown in FIG. 5 is replaced by the cleaning portion recesses 14E, and first and third sets from the tip end of the cleaning portion 2E are constituted by the cleaning portion recesses 14 arranged so that the depth direction of the cleaning portion recesses coincides with the mold opening and closing direction of the second dies 40 and 41. Here, one or plural sets of the cleaning portion recesses 14 at an arbitrary position in the cleaning portion 2 can also be replaced by the cleaning portion recesses 14E.

When the angle θ2 exceeds 60°, holding pins 62 (see FIG. 17) provided in adjacent cleaning soft portion molding portions 46 sometimes interfere with each other, so that the angle θ2 is preferably set to 60° or less, desirably 45° or less. The cleaning portion recess can also be formed by giving the angle θ2 to an opposite side across a segment in the mold opening and closing direction, which passes through the center of the cleaning portion 2, or alternatively, plural types of the cleaning portion recesses with different angles θ2 can also be provided for the cleaning portion.

As described above, when the cleaning portion recesses 14E are provided at positions where the angle θ2 is provided with respect to the mold opening and closing direction, in the case of forming the plurality of cleaning protrusions 21b, which protrude outward, in the cleaning soft portion 21, a degree of freedom in arrangement layout of the cleaning protrusions 21b can be improved. In other words, the cleaning portion recesses 14E are formed by holding pins which hold the core base portion 12 in the central part of the second molding space 42. Since the positions of the holding pins 62 can be adjusted in the length direction and the circumferential direction with respect to the second molding space 42 without interfering with the forming positions of the cleaning protrusions 21b, the degree of freedom in the arrangement layout of the cleaning protrusions 21b can be improved. Further, since the handle base portion 11 is formed flat, when the space between the molars is cleaned with the handle base portion 11 being grepped with the fingers, the cleaning portion 2 is curved as shown by a virtual line in FIG. 2A and FIG. 2B within a plane substantially perpendicular to the plane including the handle base portion 11 (that is, in the mold opening and closing direction). Since the cleaning portion recesses 14E are disposed so that the depth direction thereof forms an angle θ2 with respect to the mold opening and closing direction, the core base portion 12E can be effectively prevented from being broken from the cleaning portion recess 14E as a starting point.

<Manufacturing Method>

Next, a method for manufacturing the interdental cleaning tool will be described.

As shown in FIG. 13, FIG. 14, FIG. 15A and FIG. 15B, the method for manufacturing the interdental cleaning tool includes: a base portion molding step of filling a synthetic resin material into first molding spaces 32 of the first dies 30 and 31 to form the base portions 10; and a soft portion molding step of placing in the second molding spaces 42 of the second dies 40 and 41, the base portions 10 molded in the first dies 30 and 31 and then filling an elastomeric material into the second molding spaces 42 to form the soft portions 20. Note that the first dies 30 and 31 correspond to a first mold and second mold of the first die, respectively, and the second dies 40 and 41 correspond to a first mold and second mold of the second die, respectively.

(Base Portion Molding Step)

Figure 13:
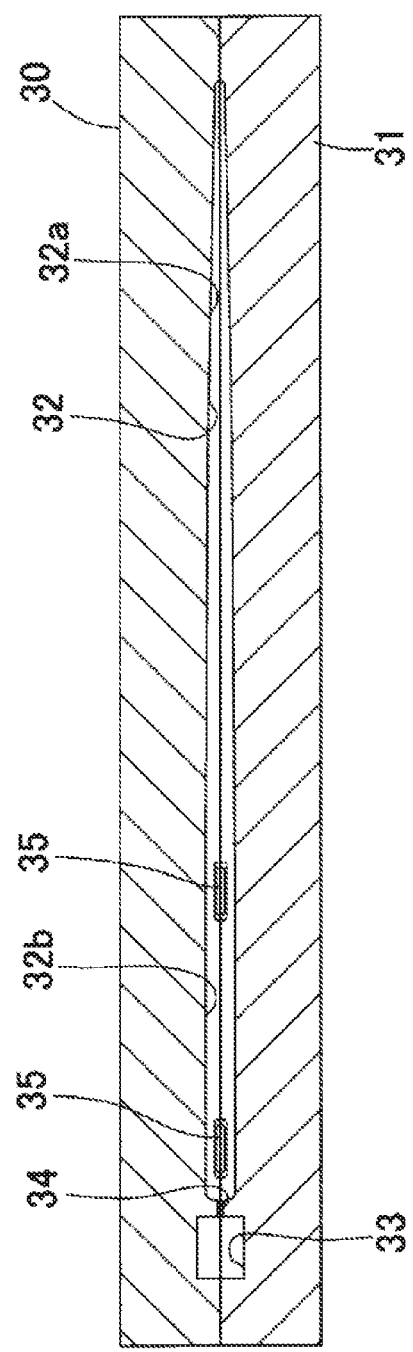
FIG. 13 is an explanatory view of a method of molding a base portion with a first die.

At the base portion molding step, as shown in FIG. 13, a synthetic resin material is filled into the first molding spaces 32 of the first dies 30 and 31 to form the base portions 10. More specifically, the first dies 30 and 31 used have: a plurality of the first molding spaces 32 that are arranged in parallel, and each have a core base portion molding portion 32a and a handle base portion molding portion 32b; a pair of connecting portion molding portions 35 each formed between the adjacent handle base portion molding portions 32b to communicate therewith; a runner 33 formed on the base end side of the plurality of first molding spaces 32; and gates 34 through which the first molding spaces 32 communicate with the runner 33. When supplied to the runner 33, a synthetic resin material is allowed to pass through the gates 34 and filled into the first molding spaces 32 to allow a plurality of the base portions 10 to be simultaneously molded. Thus, a primary molded product 10A is formed, which includes the plurality of base portions 10, a runner portion 37, gate portions 36, and the connecting portions 13. The base portions 10 may be molded one by one. However, the simultaneous molding of a plurality of base portions 10 makes it possible to improve the productivity and to transfer the base portions 10 at the same time by holding the molded runner portion 37, which can improve the workability and thus is preferred. Each gate 34 may be formed at any position on the base end portion side opposite to the core base portion molding portion 32a of the first molding space 32, more preferably on the base end portion side opposite to the core base portion molding portion 32a of the first molding space 32 with respect to the connecting portion molding portion 35. However, a side gate should preferably be formed as the gate 34 at the base end portion of the first molding space 32, so that a possibility of causing the gate portions 36 of the primary molded product 10A to be pinched between the second dies 40 and 41 can be reduced in the process of loading the primary molded product 10A into the second dies 40 and 41. Alternatively, a hot runner may be provided instead of the runner 33 including a cold runner in the first dies 30 and 31. However, the use of the hot runner can make the first dies 30 and 31 large and increase manufacturing cost. Therefore, the runner 33 including the cold runner is preferably provided. In addition, the plurality of base portions 10 can be stably connected to one another by the runner portion 37, which can improve the handling properties of the primary molded product 10A in the process of transferring the primary molded product 10A into the second dies 40 and 41, and thus is preferred. In addition, a pin gate having, for example, a cylindrical or spindle shape with a diameter of 0.1 to 1.5 mm can be preferably adopted as each gate 34 to allow use of a cold runner, and the gates 34 can be arranged at narrow intervals, which can make the molded product small.

(Soft Portion Molding Step)

Figure 15:
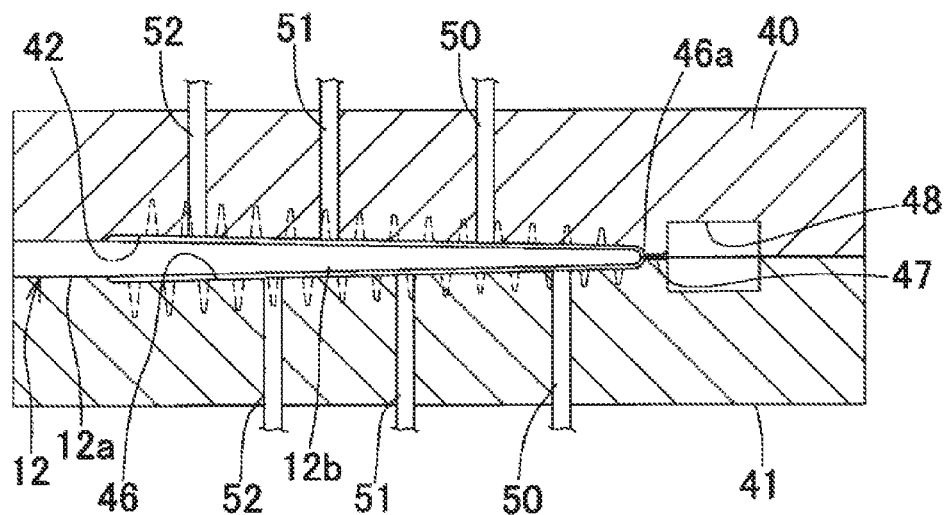
FIG. 15(a) is an explanatory view immediately before molding the soft portion with the second die.
FIG. 15(b) is an explanatory view immediately after molding the soft portion with the second die.
Figure 15:
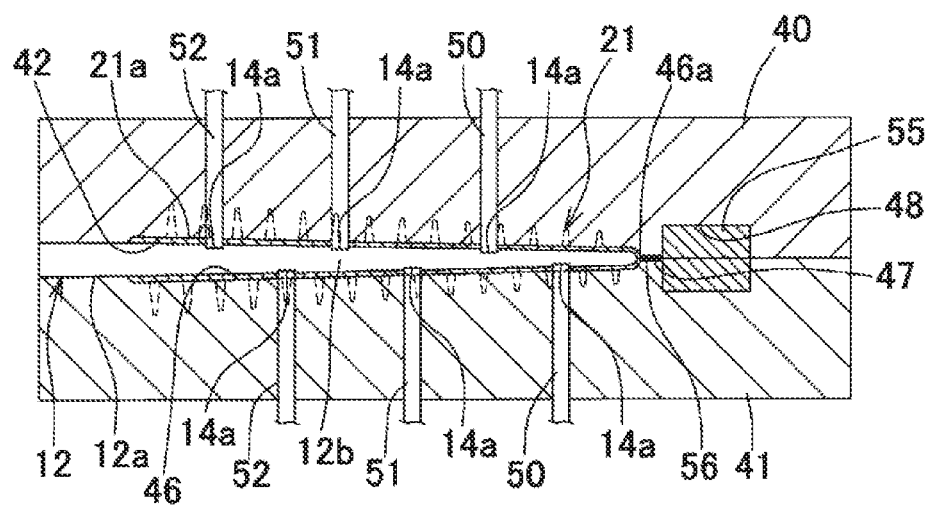
Figure 16:
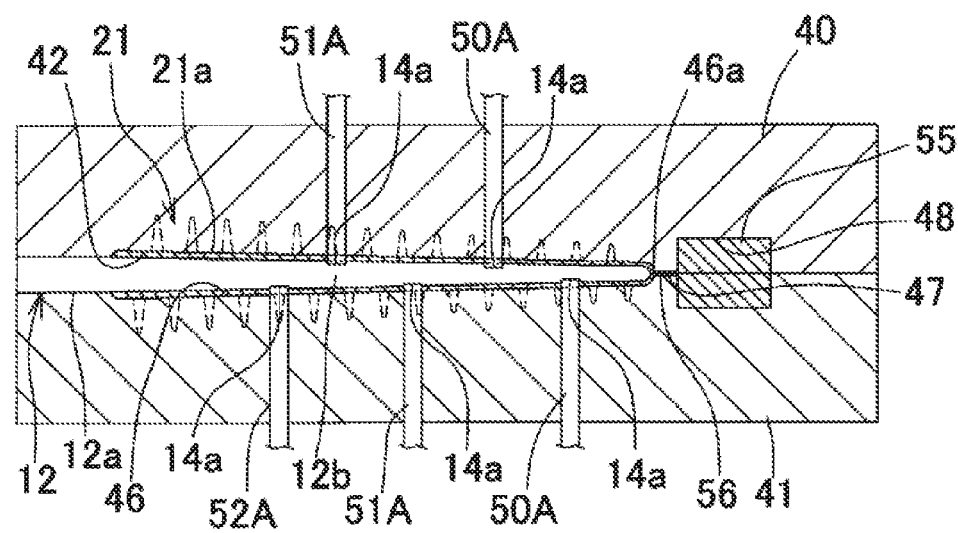
FIG. 16 is an explanatory view of a second die of another configuration.

In the soft portion molding step, as shown in FIG. 14, FIG. 15A and FIG. 15B, the primary molded product 10A molded in the first dies 30 and 31 is placed in each of the second molding spaces 42 of the second dies 40 and 41. Then, the second molding space 42 is filled with an elastomeric material to mold the soft portion 20, whereby the interdental cleaning tool connected body 5 in which a plurality of the interdental cleaning tools 1 are continuously connected in parallel to one another is obtained.

First, the second dies 40 and 41 used in the soft portion molding step will be described. The second dies 40 and 41 have a plurality of the second molding spaces 42, which are formed at positions corresponding to a plurality of the base portions 10 of the primary molded product 10A molded in the first dies 30 and 31. In addition, the second dies 40 and 41 also have fitting spaces 43, 44 and 45 formed to accommodate the runner portion 37, a plurality of the gate portions 36, and the connecting portions 13 in the primary molded product 10A. Between the second dies 40 and 41 and the base portion 10, the cleaning soft portion molding portion 46 surrounding the core base portion 12 is formed as the second molding space 42. Gates 47 which open to the tip end portions of the cleaning soft portion molding portions 46 are formed on the mating surfaces 40a and 41a of the second dies 40 and 41 on the tip end side of the cleaning soft portion molding portions 46. The plurality of gates 47 communicate with a common runner 48 formed in the second dies 40 and 41. The elastomeric material is supplied from the common runner 48 to the plurality of second molding spaces 42 via the plurality of gates 47. The gates 47 are preferably set to be a diameter of 0.1 mm or more and 1.0 mm or less.

In each of the second dies 40 and 41, the tip end side holding pin 50, the intermediate portion holding pin 51 and the base end side holding pin 52 are provided so as to respectively correspond to a tip end side portion, intermediate portion and base end side portion of the cleaning soft portion molding portion 46. Three sets of holding pins 50 to 52, each set is a pair that includes the second die 40 and the second die 41, are installed in the respective second dies (40, 41) at intervals in the axial direction of the cleaning soft portion molding portion 46 so as not to overlap each other in the circumferential direction of the cleaning soft portion molding portion 46. It should be noted that the holding pin of the second die 41 paired with the holding pin of the second die 40 means a holding pin in the same order counted from the tip end of the cleaning soft portion molding portion 46.

However, only a specific holding pin of the second die 40 and a specific holding pin of the second die 41 paired therewith can also be installed in the respective second dies (40, 41) at an interval in the axial direction of the cleaning soft portion molding portion 46 so as not to overlap each other in the circumferential direction of the cleaning soft portion molding portion 46. In particular, a large bending force tends to act on a position located by 6 mm apart from the tip end portion of the cleaning portion 2, during cleaning the space between the molars. Therefore, it is preferable that only the second holding pins 51 holding the vicinity of the position be disposed so as to be shifted in the axial direction of the cleaning soft portion molding portion 46. In this case, the remaining pairs of holding pins are provided opposite to each other with the core base portion 12 interposed therebetween, or are disposed so as to be shifted in the axial direction of the core base portion 12 within a range equal to or less than the diameter of the holding pins.

The three pairs of holding pins 50 to 52 of the second dies 40 and 41 are freely movably provided in a direction substantially perpendicular to the mating surfaces 40a and 41a of the second dies 40 and 41, that is, in the mold opening and closing direction of the second dies 40 and 41. As shown in FIG. 15(b), the core base portion 12 of the base portion 10 has the tip end portions of these three pairs of holding pins 50 to 52 protruding into the cleaning soft portion molding portion 46, and the core base portion 12 is sandwiched between the tip end portions of each of the holding pins 50 to 52. In this way, the core base portion 12 is accurately positioned and held in the central part of the cleaning soft portion molding portion 46. In the present application, the holding pins may be fixed to the dies in advance in a state of protruding into the cleaning soft portion molding portion of the second die.

In addition, a cross-sectional area of the tip end portion of each of the holding pins 50 to 52, which is perpendicular to the axial direction thereof is substantially identical in size to one another, or a cross-sectional area of the holding pins 50 located at the most tip end side is smaller than the cross-sectional areas of the tip end portions of the holding pins at other positions. The intermediate portion holding pins 51 and the base end side holding pins 52 are configured to be substantially identical in size to one another, or configured so that the intermediate portion holding pins 51 are larger than the base end side holding pins 52. That is, a passage area at the tip end side portion of the cleaning soft portion molding portion 46 is small. Accordingly, the cross-sectional area of the tip end side holding pins 50 is made as small as possible, whereby a flow resistance of the elastomeric material is set as small as possible. In addition, the influence of the Karman vortex generated during molding is suppressed, whereby poor filling of the elastomeric material with respect to the cleaning soft portion molding portion 46 can be prevented, and excessive melting of the core base portion 12 can be prevented. Accordingly, such a small cross-sectional area of the tip end side holding pins 50 is preferable. However, it is also possible to set the cross-sectional areas of the holding pins 50 to 52 to be identical to one another. In addition, it is also possible to provide a plurality of sets of the intermediate portion holding pins 51 at intervals in the axial direction.

Specifically, the holding pins 50 to 52 of the second die 41 are configured as follows. Here, the holding pins 50 to 52 of the second die 40 are configured similarly to the holding pins 50 to 52 of the second die 41 except for being disposed so as to be shifted to the base end portion side with respect to the holding pins 50 to 52 of the second die 41, and accordingly, only the holding pins 50 to 52 of the second die 41 will be described.

The tip end side holding pin 50 of the second die 41 is provided within a range of 3 mm from a tip end portion 46a of the cleaning soft portion molding portion 46 toward the base end side, and the cross-sectional area thereof is set to 0.03 mm$^2$ to 0.3 mm$^2$. Further, the intermediate portion holding pin 51 is provided within a range of ±10% of the length of the cleaning portion 2 in the axial direction around an intermediate point between the tip end side holding pin 50 and the base end side holding pin 52, and the cross-sectional area thereof is set to 0.12 mm$^2$ to 1.2 mm$^2$. In addition, the base end side holding pin 52 is provided within a range of 6 mm from the base end portion of the cleaning soft portion molding portion 46 toward the tip end side, and the cross-sectional area thereof is set to 0.1 mm$^2$ to 1.1 mm$^2$. The cross-sectional areas are set to these values, whereby it can be expected not only to ensure the fixation of the core base portion 12 during molding but also to prevent the influence on the molded product due to the Karman vortex generated during molding.

In the soft portion molding step, in a state in which the primary molded product 10A is placed in the second molding space 42 and the mold is closed, as shown in FIG. 15(a), a pair of the tip end side holding pins 50, a pair of the intermediate portion holding pins 51, and a pair of the base end side holding pins 52 are protruded in the cleaning soft portion molding portion 46, as shown in FIG. 15(b). Then, the core base portion 12 is held by these three sets of the holding pins 50 to 52, the elastomeric material is injected and supplied to the plurality of gates 47 through the common runner 48, so as to be filled into the cleaning soft portion molding portion 46. At this time, the core base portion 12 is softened by heat of the elastomeric material, and the tip end portions of the holding pins 50 to 52 cause the core base portion recesses 14a to be formed alternately on the first side portion and second side portion of the core base portion 12 at intervals in the axial direction of the core base portion 12. In this way, a pair of the core base portion recesses can be prevented from being formed at the same position in the axial direction of the core base portion 12. Therefore, the cross-sectional area of the core base portion 12 at each of the positions corresponding to the core base portion recesses 14a can be increased to prevent the core base portion 12 from being broken. In addition, since the positions in the axial direction of the core base portion, where the respective holding pins apply force to the core base portion, do not overlap each other, a portion in the axial direction of the core base portion, where the core base portion is subjected to the force, is longer than that in the arrangement of the holding pins which overlap each other in the circumferential direction. As a result, the core base portion is more firmly held, and the core base portion recesses 14Ea formed during the molding of the soft portion 20 is suppressed from being deepened. Hence, the cross-sectional area of the core base portion 12 at each of the positions corresponding to the core base portion recesses 14Ea is increased, and the occurrence of breakage of the core base portion 12 can be prevented. Furthermore, since the interval between the holding pins 50 to 52 of the second die 40 and the interval between the holding pins 50 to 52 of the second die 41 in the length direction of the core base portion 12 are shortened, it is possible to hold the core base portion satisfactorily stably. Further, the cross-sectional area of the holding pin 50 is set smaller than the cross-sectional areas of the holding pins 51 and 52. Accordingly, when the filling of the elastomeric material from the tip end portion of the cleaning soft portion molding portion 46 toward the base end side thereof is not inhibited by the holding pins 50 to 52 as much as possible, even if an injection pressure somewhat varies, the core base portion 12 can be prevented from being curved, and the cleaning soft portion 21 including the elastomeric material can be molded with high accuracy. In this embodiment, the holding pins 50 to 52 are fixed to the dies in advance in a state in which the holding pins 50 to 52 are protruded into the cleaning soft portion molding portion of the second dies, and it is also possible to adopt a manufacturing method in which the core base portion is held when the second dies 40 and 41 are closed.

In this way, after the base portion 10 is covered with the soft portion 20, the runner portion 37 and the gate portions 36, which contain the synthetic resin, are removed. In addition, a runner portion 55 and gate portions 56, which contain the elastomer molded by the runner 48 and the gates 47, are removed. In this way, the interdental cleaning tools 1 are obtained.

Figure 23:
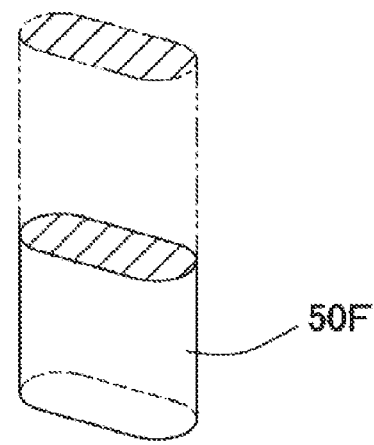
FIG. 23 is a perspective view of a main part of a tip end side portion of a holding pin that forms a cleaning portion recess with a bale shape (rectangular shape with curved short side portions, rectangular shape with rounded corners).

The cross-sectional shape of the tip end portion of each of the holding pins 50 to 52 is formed circular in the present embodiment. In order to further suppress the influence of the Karman vortex during molding, the cross-sectional shape may be formed in, for example, an oval shape, a teardrop shape, a rectangular shape, a bale shape (rectangular shape with curved short side portions, rectangular shape with rounded corners) elongated in the length direction of the cleaning soft portion molding portion 46. Moreover, holding pins having different cross-sectional shapes may be arbitrarily combined and used. When the cleaning portion recess 14F having a bale shape (rectangular shape with curved short side portions, rectangular shape with rounded corners) as shown in FIG. 20A and FIG. 20B is formed for the holding pins elongated in the length direction of the cleaning soft portion molding portion 46, holding pins 50F are provided, each of which has a cross-sectional shape elongated in the length direction of the second molding space 42, i.e., a bale shape (rectangular shape with curved short side portions, rectangular shape with rounded corners) in this embodiment, instead of the holding pins 50 to 52, as shown in FIG. 23. A length dimension of each of the holding pins along the length direction of the second molding space is set to 0.4 mm or more and 1.5 mm or less, more preferably 0.5 mm to 1.0 mm, and a cross-sectional area thereof (sectional area of a cross section perpendicular to the axial direction of the tip end portion) is set to 0.2 mm$^2$ or more and 0.6$^2$ mm or less. The pins are formed into a shape elongated in the length direction of the second molding space 42, whereby the influence of the Karman vortex during the molding can be suppressed. In addition to the bale shape (rectangular shape with curved short side portions, rectangular shape with rounded corners), various shapes, such as an elliptical shape, a rectangular shape, and a teardrop shape are possible. Further, as shown in FIG. 22A, FIG. 22B and FIG. 22C, when the cleaning portion recesses 14G having a long shape are formed at an angle with respect to the axial direction of the cleaning portion 2G, holding pins 50G having a rectangular plate-shaped cross section are provided at an angle with respect to the length direction of the second molding space 42 as shown in FIG. 22C, instead of the holding pins 50 to 52.

Figure 18:
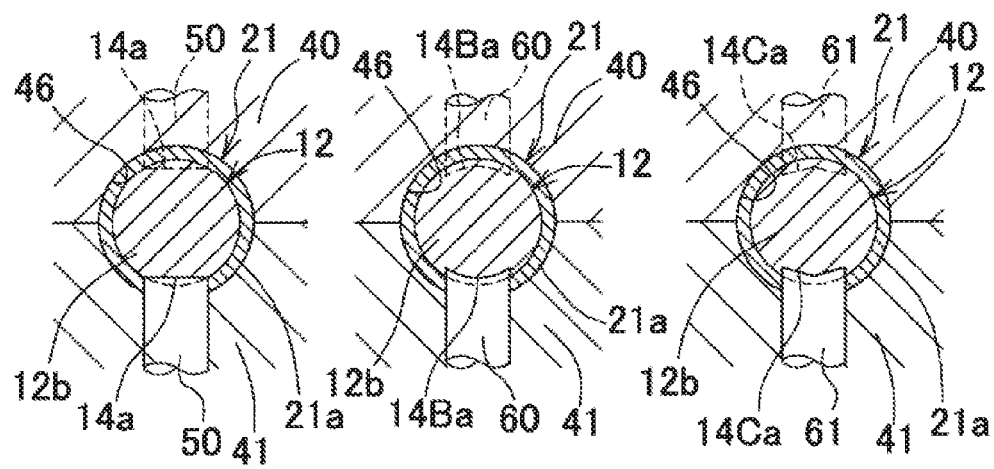
FIGS. 18(a), 18(b) and 18(c) are explanatory views showing end shapes of holding pins of other configurations.

Tip end surfaces of the holding pins 50 to 52, which abut against the core base portion 12, are constituted by flat surfaces perpendicular to the axial direction of the holding pins 50 to 52, as shown in FIG. 18(a). Here, the tip end surfaces may be constituted by circular arc surfaces along the outer peripheral surface of the core base portion 12, as in holding pins 60 shown in FIG. 18(b), or may be each constituted by a pair of inclined planes connected in an isosceles triangle as in holding pins 61 shown in FIG. 18(c). With this configuration, a contact area between the core base portion 12 and each of the holding pins 60 and 61 can be set large, and a depth of the core base portion recesses 14a can be set shallow. In addition, the core base portion 12 can be accurately held in the central part of the second molding space 42, and moreover, the holding properties for the core base portion 12 can be improved. Accordingly, this configuration is preferable. Moreover, holding pins having tip end surfaces with different shapes may be arbitrarily combined and used.

Figure 9:
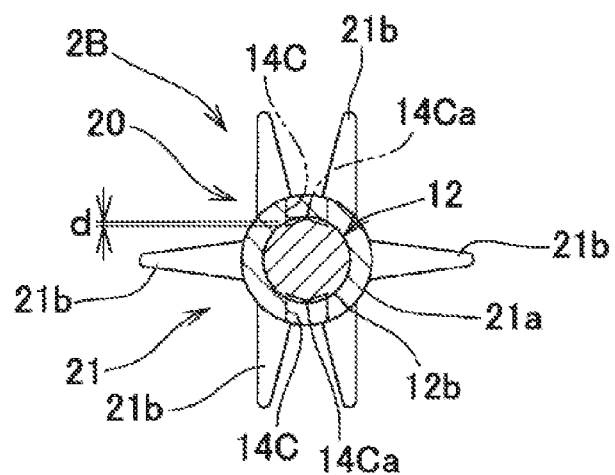
FIG. 9 is a view of a cleaning portion of another configuration, the view corresponding to FIG. 6.
Figure 24A:
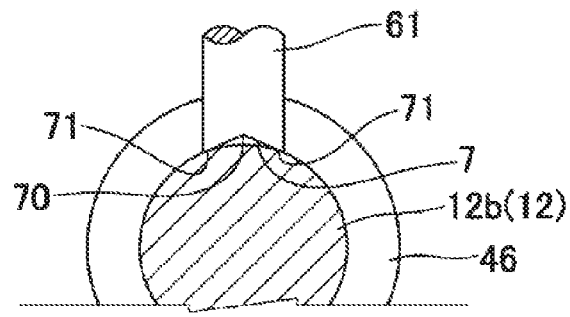
FIGS. 24(a), 24(b) and 24(c) are explanatory views showing a state in which the core base portion is supported by a holding pin having a hollow at a tip end portion thereof.
Figure 24A:
Figure 24B:
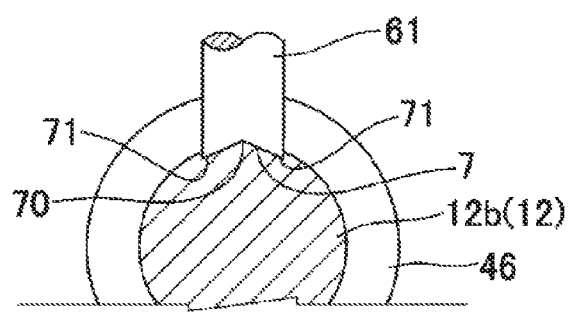
Figure 24B:
Figure 24C:
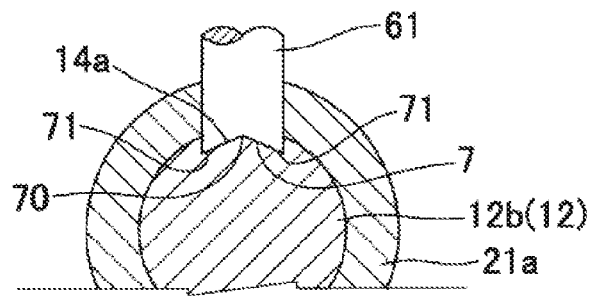

Here, when a bottom surface shape of the core base portion recesses 14Ca is formed into an inverted V-shaped mount shape in which a center is raised, as shown in FIG. 9, a tip end supporting surface 7 abutting against the core base portion 12 of each of the holding pins 61 is formed such that a central part 70 is recessed as compared with both side parts 71 and 71 when viewed from the axial direction of the cleaning soft portion molding portion 46, as shown in FIG. 24A, FIG. 24B and FIG. 24C. In addition, the tip end supporting surface 7 is formed into a shape having regions which abut against at least both side parts 71 from the beginning when the holding pin 61 contacts the outer surface of the core base portion 12. As a result, unlike the conventional holding pin with a flat tip end or a raised center, the core base portion 12 is held in a stable posture by force dispersed from the beginning of the contact of the holding pin by the at least both side parts 71. Therefore, the holding pin 61 can hold the core base portion 12 without deeply biting into the core base portion 12, and the depth of the core base portion recess 14a to be formed can be made shallow.

More specifically, as shown in FIG. 24A, FIG. 24B and FIG. 24C, both side parts 71 are first brought into contact with the outer surface of the core base portion 12, and hold the core base portion 12 in a stable posture at at least two positions as compared with the conventional flat pin, the holding pin 61 usually bites into the core base portion 12, due to the core base portion 12 being not completely cooled down and being in a soft state, or due to own weight thereof or the like. However, the holding pin 61 supports the core base portion 12 at at least two positions from the beginning, and therefore, force thereof is dispersed. Instead of biting deeply from the beginning like the conventional flat pin, the holding pin 61 receives the force on the entire tip end supporting surface 7, and such a biting depth is suppressed.

Then, particularly while the elastomer is being filled and molded, the core base portion 12 is thermally expanded or softened by being exposed to high temperature elastomer, and furthermore, the core base portion 12 receives force and vibrates during the filling with the elastomer, and the holding pin 61 attempts to further bite into the core base portion 12. However, in the present invention, the core base portion 12 is held in a stable posture at two positions from the beginning, and the above-described vibrations can also be effectively suppressed. Therefore, final biting is also suppressed to be shallow.

Figure 25:
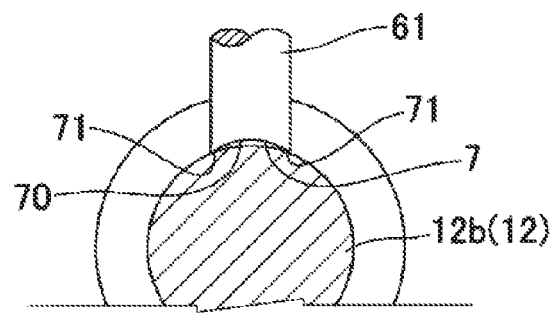
FIGS. 25(a), 25(b) and 25(c) are explanatory views individually showing other modification examples of the holding pin having the hollow at the tip end portion.
Figure 25:
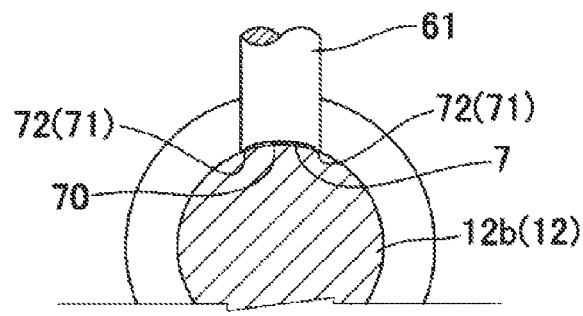
Figure 25:
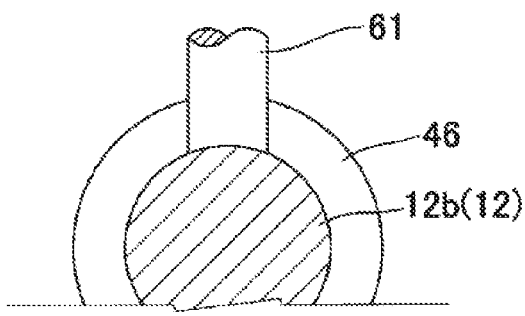

In this embodiment, the shape of the tip end supporting surface 7 of the holding pin 61 is formed into a shape recessed substantially in a V shape when viewed from the axial direction of the cleaning soft portion molding portion 46. However, the present invention is not limited to this. As long as the shape of the tip end supporting surface 7 is such a shape having regions which abut against both side parts 71 from the beginning of the holding pin 61 contacting the outer surface of the core base portion 12, it is preferable that the shape of the tip end supporting surface 7 may be one having a gentle shape that is substantially U-shaped when viewed from the axial direction of the cleaning soft portion molding portion 46 as shown in FIG. 25(a), and may be a shape in which protrusions 72 are provided on both side portions when viewed from the axial direction of the cleaning soft portion molding portion 46 as shown in FIG. 25(b), for example.

Both side parts 71, which abut against the core base portion 12 from the beginning, do not necessarily have to include the exemplified side end edges of the tip end supporting surface 7, but may be intermediate regions between the central part 70 and the side end edges. In addition, in each of the above-described examples of the tip end supporting surface 7, such a shape is adopted, in which the central part 70 initially maintains a gap with the outer surface of the core base portion 12 without abutting against the outer surface. However, the present invention is not limited to this. The tip end supporting surface 7 just needs to have a shape in which at least both side parts 71 sandwiching the central part 70 abut against the outer surface from the beginning. Such a shape in which the central part 70 also abuts simultaneously is also included in the present invention. Specifically, a shape shown in FIG. 25(c), which is substantially U-shaped as in FIG. 25(a) and has the entire surface of the tip end supporting surface 7 abutting against the core base portion 12 from the beginning, is also included in the present invention.

The arrangement positions of the holding pins 50 to 52 with respect to the second dies 40 and 41 can also be configured as follows.

Figure 17:
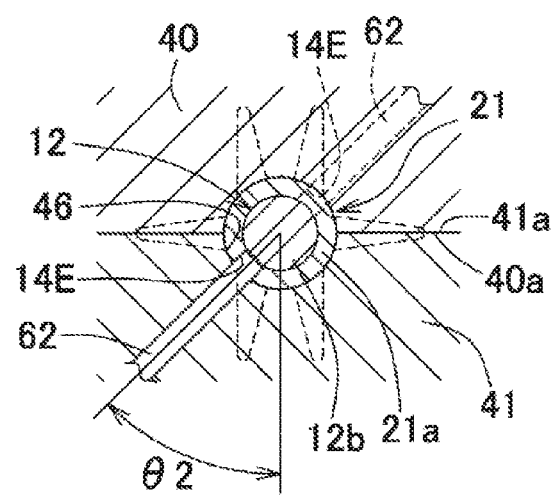
FIG. 17 is an explanatory view of a second die of another configuration.

Like the holding pins 62 of the second dies 40 and 41 shown in FIG. 17, the holding pin 62 of the first die 40 and the holding pin 62 of the second die 41 can also be disposed in such a manner of being opposite to each other with the core base portion 12 interposed therebetween, and that the axial direction thereof forms the angle θ2 in the circumferential direction with respect to the mold opening and closing direction of the second dies 40 and 41.

For example, only the second set of the holding pins from the tip end of the cleaning soft portion molding portion 46 can be replaced by the holding pins 62. In addition, the first and third sets from the tip end of the cleaning soft portion molding portion 46 can be constituted by the holding pins arranged so that the axial direction thereof coincides with the mold opening and closing direction of the second dies 40 and 41. However, one or plural sets of the holding pins at arbitrary positions in the cleaning soft portion molding portion 46 can be replaced by the holding pins 62.

When the angle θ2 exceeds 60°, the holding pins 62 provided in the adjacent cleaning soft portion molding portions 46 sometimes interfere with each other, so that the angle θ2 is set preferably to 60° or less, desirably 45° or less. Plural types of the holding pins 62 having different angles θ2 can also be provided in the second dies 40 and 41.

As described above, the holding pins 62 may be provided at the positions where the angle θ2 is provided with respect to the mold opening and closing direction. Under such a condition, when the plurality of cleaning protrusions 21b which protrude outward are formed in the cleaning soft portion 21, the degree of freedom in arrangement layout of the cleaning protrusions 21b can be improved. In other words, the holding pins 62 are molded by the holding pins 62 which hold the core base portion 12 in the central part of the cleaning soft portion molding portion 46. Since the positions of the holding pins 62 can be adjusted in the length direction and the circumferential direction with respect to the cleaning soft portion molding portion 46 so that the holding pins 62 do not interfere with the forming positions of the cleaning protrusions 21b, the degree of freedom in the arrangement layout of the cleaning protrusions 21b can be improved. Further, the handle base portion 11 is formed flat. When the space between the molars is cleaned with the handle base portion 11 being grepped with the fingers, the cleaning portion 2 is curved within the plane substantially perpendicular to the plane including the handle base portion 11 (that is, in the mold opening and closing direction). Since the holding pins 62 are disposed so as to form the angle θ2 with respect to the mold opening and closing direction, the core base portion 12 can be effectively prevented from being broken from the core base portion recess 14Ea, which is formed by each of the holding pins 62, as a starting point during use.

(Analysis Result)

Next, a description will be given of analysis results of finite element analysis, in which the influence of the shape and arrangement positions of the core base portion recesses 14a with respect to the bending force of the core base portion 12 was examined.

First, a description will be given of Examples 1 to 19 and Comparative Examples 1 to 9, in each of which the finite element analysis was performed.

As a common configuration of the core base portion 12, a rod-shaped core base portion having a diameter of 0.65 mm and a length of 10 mm was used, in which core base portion recesses with a predetermined depth were formed in a first side portion and a second side portion. In the examples, tests were carried out while placing the first side portion at a lower position. Accordingly, a "lower surface" coincides with the first side portion, and an "upper surface" coincides with the second side portion. Further, the "planar shape of the recess" means a shape obtained when the core base portion recess is observed from above. The "diameter or width of the recess" means a diameter when a planar shape of the core base portion recess is circular, and when the planar shape is, other than being circular, means a maximum length among lengths between intersections of planes (VS in FIG. 19) perpendicular to a central axis (CL in FIG. 19) of the core base portion and the end portions of the core base portion recess. The "length of the recess" means a maximum length among lengths (UL in FIG. 19) between intersections (T, B in FIG. 19) of the plane (BS in FIG. 19) including the central axis (CL in FIG. 19) of the core base portion and the end portions of the core base portion recess. The "depth of recess" means a "maximum depth of the core base portion recess".

In Example 1, on the first side portion of the core base portion, a core base portion recess having a circular shape with a diameter of 0.4 mm and a depth of 0.07 mm was formed with a center thereof positioned at a position of 6.0 mm from a tip end portion of the core base portion. In addition, on the second side portion of the core base portion, a core base portion recess having a circular shape with a diameter of 0.4 mm and a depth of 0.07 mm was formed with a center positioned at a position of 6.8 mm from the tip end portion of the core base portion. That is, an interval between the core base portion recesses of the first side portion and the second side portion in the axial direction (UL direction in FIG. 19) of the core base portion was set to twice the maximum axial length of the core base portion recess. For the test, the first side portion was placed on the "lower surface". The "interval between the core base portion recesses of the first side portion and the second side portion in the axial direction of the core base portion" is obtained by the following procedure. First, a plane (BS in FIG. 19) including UL and a center line (CL in FIG. 19) of the core base portion is set. Next, perpendicular lines are drawn to CL from the intersections (B, T in FIG. 19) of the respective core base portion recesses of the first side portion and the second side portion and the BS, and intersections of the perpendicular lines and CL are obtained. There is obtained a minimum length between the intersection of the perpendicular line and CL which is obtained from the first side portion, and the intersection of the perpendicular line, and CL which is obtained from the second side portion. The obtained minimum length is defined as the "interval between the core base portion recesses of the first side portion and the second side portion in the axial direction of the core base portion".

Example 2 was configured similarly to Example 1 except that the first side portion in which the core base portion recess was formed with the center positioned at a position of 6.0 mm from the tip end portion of the core base portion was placed on the lower surface, and that the interval between the core base portion recesses of the first side portion and the second side portion in the axial direction of the core base portion was set to three times the maximum axial length of the core base portion recess.

Example 3 was configured similarly to Example 1 except that, as each of the core base portion recesses, a bale shape (rectangular shape with curved short side portions, rectangular shape with rounded corners), in which both end portions were formed into semicircles with a diameter of 0.4 mm and a length of the recess was set to 1.14 mm, was formed.

Example 4 was configured similarly to Example 2 except that, as each of the core base portion recesses, a bale shape (rectangular shape with curved short side portions, rectangular shape with rounded corners), in which both end portions were formed into semicircles with a diameter of 0.4 mm and a length of the recess was set to 1.14 mm, was formed.

Example 5 was configured similarly to Example 1 except that, as each of the core base portion recesses, a core base portion recess having a rectangular shape, in which a width of the recess was set to 0.4 mm and a length of the recess was set to 1.2 mm.

Example 6 was configured similarly to Example 2 except that, as each of the core base portion recesses, a core base portion recess having a rectangular shape, in which a width of the recess was set to 0.4 mm and a length of the recess was set to 1.2 mm, was formed.

Example 7 was configured similarly to Example 3 except that the interval between the core base portion recesses of the first side portion and the second side portion in the axial direction of the core base portion was set to 1 time the maximum axial length of the core base recess.

Example 8 was configured similarly to Example 3 except that the interval between the core base portion recesses of the first side portion and the second side portion in the axial direction of the core base portion was set to one fourth times the maximum axial length of the core base recess.

Example 9 was configured similarly to Example 5 except that the interval between the core base portion recesses of the first side portion and the second side portion in the axial direction of the core base portion was set to 1 time the maximum axial length of the core base recess.

Example 10 was configured similarly to Example 1 except that the interval between the core base portion recesses of the first side portion and the second side portion in the axial direction of the core base portion was set to 1 time the maximum axial length of the core base recess, and that the depth of the recess was set to 0.02 mm.

Example 11 was configured similarly to Example 10 except that the depth of the recess was set to 0.05 mm.

Example 12 was configured similarly to Example 8 except that the depth of the recess was set to 0.02 mm.

Example 13 was configured similarly to Example 12 except that the interval between the core base portion recesses of the first side portion and the second side portion in the axial direction of the core base portion was set to 1 time the maximum axial length of the core base recess.

Example 14 was configured similarly to Example 12 except that the depth of the recess was set to 0.05 mm.

Example 15 was configured similarly to Example 14 except that the interval between the core base portion recesses of the first side portion and the second side portion in the axial direction of the core base portion was set to 1 time the maximum axial length of the core base recess.

In Example 16, a core base portion recess having a rectangular shape was formed, in which a width of the recess was set to 0.4 mm, a length of the recess was set to 1.14 mm, and a depth of the recess was set to 0.02 mm. In addition, the interval between the core base portion recesses of the first side portion and the second side portion in the axial direction of the core base portion was set to one fourth times the maximum axial length of the core base recess.

Example 17 was configured similarly to Example 16 except that the interval between the core base portion recesses of the first side portion and the second side portion in the axial direction of the core base portion was set to 1 time.

Example 18 was configured similarly to Example 16 except that the depth of the core base portion recess was set to 0.05 mm.

Example 19 was configured similarly to Example 17 except that the depth of the core base portion recess was set to 0.05 mm.

Comparative Example 1 was configured similarly to Example 1 except that the core base portion recess of the second side portion of the core base portion was formed at a position of 6.0 mm from the tip end portion of the core base portion, and that the core base portion recesses of the first side portion and the second side portion were formed at the same position.

Comparative Example 2 was configured similarly to Example 1 except that the core base portion recess of the second side portion of the core base portion was formed at the position of 6.0 mm from the tip end portion of the core base portion, and that the interval between the core base portion recesses of the first side portion and the second side portion in the axial direction of the core base portion was overlapped by one half length of a diameter as the maximum axial length of each of the core base portion recesses.

Comparative Example 3 was configured similarly to Example 1 except that the core base portion recess of the second side portion of the core base portion was formed at a position of 6.0 mm from the tip end portion of the core base portion, and that the core base portion recesses of the first side portion and the second side portion were formed at positions of circumscribing each other in the axial direction of the core base portion.

Comparative Examples 4 to 6 were configured similarly to Comparative Examples 1 to 3, respectively except that a core base portion recess having a bale shape (rectangular shape with curved short side portions, rectangular shape with rounded corners), in which both end portions were formed into semicircles with a diameter of 0.4 mm and a length of the recess was set to 1.14 mm, was formed, for each of the core base portion recesses of the first side portion and the second side portion.

Comparative Examples 7 to 9 were configured similarly to Comparative Examples 1 to 3, respectively except that a core base portion recess having a rectangular shape, in which a width of the recess was set to 0.4 mm and a length of the recess was set to 1.2 mm, was formed, for each of the core base portion recesses of the first side portion and the second side portion of the core base portion. Since the planar shape of the recesses of Comparative Examples 1 to 3 is circular, the "diameter of the recess" is defined as the "width of the recess".

Then, with regard to each of the core base portions of Examples 1 to 19 and Comparative Examples 1 to 9, one end portion thereof was fixed, and the core base portion was horizontally supported in a cantilever manner so that the core base portion recesses were disposed on the upper and lower surfaces of the core base portion. In this state, a force of 1N was applied downward to the other end portion of the core base portion. At that time, a stress distribution in the periphery of each of the core base portion recesses was analyzed by finite element analysis, and a maximum value of the stress in the periphery of the core base portion recess was obtained. The analysis results and the maximum stress values are shown in FIG. 26, FIG. 27, FIG. 28, FIG. 29, and FIG. 30. In the analysis results of FIG. 26, FIG. 27, FIG. 28, FIG. 29, and FIG. 30, only the stress distributions of the core base portions in the peripheries of the core base portion recesses on the lower surface (first side portion) side are shown. Further, in each of the analysis results shown in FIG. 26, FIG. 27, FIG. 28, FIG. 29, and FIG. 30, a mesh is described in a background of the core base portion so that the outer shape of the core base portion becomes clear.

The core base portion recesses of the first side portion and the second side portion may be arranged to be shifted in the axial direction so as not to overlap each other in the circumferential direction of the cleaning portion as in Examples 1 to 19, regardless of the depths of the core base portion recesses being the same or different. In such a situation, the stress value becomes small, so that the core base portion becomes less breakable even if the core base portion is bent at the time of the insertion into the space between the molars, as shown in Tables 1 and 2. From Examples 1 to 19 and Comparative Examples 1 to 3, it is understood that the stress value tends to decrease as such a separation distance between the core base portion recesses of the upper and lower surfaces in the axial direction becomes larger. Further, it is understood that the stress value becomes smaller when the shape of the core base portion recesses is the bale shape (rectangular shape with curved short side portions, rectangular shape with rounded corners) or rectangular shape rather than a circular shape.

While the embodiments of the present invention have been described above, it is understood that the above embodiments are not intended at all to limit the present invention, and the configurations of the embodiments may be changed or modified without departing from the gist of the present invention.

REFERENCE SIGNS LIST

1 Interdental cleaning tool
2 Cleaning portion
3 Handle portion
5 Interdental cleaning tool connected body
10 Base portion
10A Primary molded product
11 Handle base portion
11a Side surface
12 Core base portion
12a Exposed portion
12b Core main body
13 Connecting portion
13a Boundary portion
14 Cleaning portion recess
14a Core base portion recess
20 Soft portion
21 Cleaning soft portion
21a Covering portion
21b Cleaning protrusion
2A Cleaning portion
14A Cleaning portion recess
14Aa Core base portion recess
14B Cleaning portion recess
14Ba Core base portion recess
14C Cleaning portion recess
14Ca Core base portion recess
2D Cleaning portion
14D Cleaning portion recess
14Da Core base portion recess
2E Cleaning portion
12E Core base portion
14E Cleaning portion recess
14Ea Core base portion recess
2F Cleaning portion
14F Cleaning portion recess
14Fa Core base portion recess 2G Cleaning portion
14G Cleaning portion recess
14Ga Core base portion recess
First die
31 First die
32 First molding space
32a Core base portion molding portion
32b Handle base portion molding portion
33 Runner
34 Gate
35 Connecting portion molding portion
36 Gate portion
37 Runner portion
40 Second die
40a Mating surface
41 Second die
41a Mating surface
42 Second molding space
43 Fitting space
44 Fitting space
45 Fitting space
46 Cleaning soft portion molding portion
46a Tip end portion
47 Gate
48 Runner
50 Tip end side holding pin
51 Intermediate portion holding pin
52 Base end side holding pin
55 Runner portion
56 Gate portion
50A-52A Holding pin
60 Holding pin
61 Holding pin
62 Holding pin
70 central part
71 Both side portions
72 Protrusion

The invention claimed is:

1. An interdental cleaning tool comprising:
a base portion made of a synthetic resin; and
a soft portion made of an elastomer that covers at least a part of the base portion,
the base portion including a handle base portion, and a core base portion that has an elongated shaft-shape and connects continuously to a tip end portion of the handle base portion,
the soft portion having at least a cleaning soft portion that covers the core base portion,
the handle base portion constituting a handle portion serving as a grip, and
the core base portion and the cleaning soft portion which constitute a cleaning portion for interdental cleaning,
wherein two or more cleaning portion recesses which penetrate the cleaning soft portion and form core base portion recesses in the core base portion are formed on each of a first side portion and a second side portion of the cleaning portion at an interval in an axial direction of the cleaning portion,
at least one set of the two cleaning portion recesses out of plural sets of the cleaning portion recesses pairing with each other between the first side portion and the second side portion are formed at an interval in the axial direction of the cleaning portion so as to be avoided from overlapping each other in a circumferential direction of the cleaning portion, and
the at least one set of the cleaning portion recesses formed at the interval in the axial direction of the cleaning portion has, therebetween, an interval in the axial direction of the cleaning portion, the interval being set to one fourth or more and three times or less of a maximum axial length of the cleaning portion recesses.

2. The interdental cleaning tool according to claim 1, wherein the at least one set of the cleaning portion recesses formed at the interval in the axial direction of the cleaning portion has, therebetween, an interval in the axial direction of the cleaning portion, the interval being set to one fourth or more of a maximum axial length of the cleaning portion recesses.

3. The interdental cleaning tool according to claim 1, wherein the cleaning portion recesses are arranged at a substantially uniform interval, or at an interval narrowed as approaching to a tip end side of the cleaning portion, in the axial direction of the cleaning portion.

4. The interdental cleaning tool according to claim 1, wherein the two or more core base portion recesses have opening areas that are set to be substantially identical in size to one another, or are set so that an opening area of the core base portion recess on a most tip end side among the plurality of core base portion recesses is smallest.

5. The interdental cleaning tool according to claim 1, wherein the core base portion recess in at least one of the two or more of cleaning portion recesses has an opening that has a shape elongated in the axial direction of the cleaning portion.

6. The interdental cleaning tool according to claim 5, wherein the core base portion recess elongated in the axial direction has a maximum axial length of 0.4 mm or more and 1.5 mm or less.

7. The interdental cleaning tool according to claim 5, wherein the core base portion recess elongated in the axial direction has an opening area of 0.15 $mm^2$ or more and 0.6 $mm^2$ or less.

8. The interdental cleaning tool according to claim 1, wherein the core base portion recesses have a maximum depth set to 0.01 mm or more and 0.085 mm or less.

* * * * *